US012596209B2

(12) United States Patent (10) Patent No.: US 12,596,209 B2
Gotrik et al. (45) Date of Patent: Apr. 7, 2026

(54) LIGHT CONTROL FILM INCLUDING OPTICAL CAVITIES CONTAINING LIQUID

(71) Applicant: 3M INNOVATIVE PROPERTIES COMPANY, St. Paul, MN (US)

(72) Inventors: Kevin W. Gotrik, Hudson, WI (US); Stephen J. Etzkorn, Woodbury, MN (US); Nicholas A. Johnson, Burnsville, MN (US); Tao Liu, Woodbury, MN (US); John J. Sullivan, Hudson, WI (US); Bharat R. Acharya, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 379 days.

(21) Appl. No.: 18/303,276

(22) Filed: Apr. 19, 2023

(65) Prior Publication Data

US 2023/0350107 A1 Nov. 2, 2023

Related U.S. Application Data

(60) Provisional application No. 63/336,347, filed on Apr. 29, 2022.

(51) Int. Cl.
*G02B 5/00* (2006.01)
*G02F 1/153* (2006.01)
(52) U.S. Cl.
CPC .............. *G02B 5/003* (2013.01); *G02F 1/153* (2013.01); *G02B 2207/123* (2013.01)

(58) Field of Classification Search
CPC .... G02B 5/003; G02B 2207/123; G02B 5/00; G02F 1/153
See application file for complete search history.

(56) References Cited

U.S. PATENT DOCUMENTS

| | | | |
|---|---|---|---|
| 5,175,030 A | 12/1992 | Lu et al. |
| 5,183,597 A | 2/1993 | Lu |
| 6,322,236 B1 | 11/2001 | Campbell et al. |
| 6,323,989 B1 | 11/2001 | Jacobson et al. |
| 7,328,638 B2 | 2/2008 | Gardiner et al. |

(Continued)

FOREIGN PATENT DOCUMENTS

| | | |
|---|---|---|
| CN | 212379680 U | 1/2021 |
| JP | 2007206373 A | 8/2007 |

(Continued)

*Primary Examiner* — Balram T Parbadia
(74) *Attorney, Agent, or Firm* — Clifton F. Richardson

(57) ABSTRACT

A light control film includes a plurality of substantially parallel optical cavities. Each of the optical cavities has a height H along a thickness direction of the light control film and a minimum lateral dimension W along an in-plane width direction orthogonal to the thickness direction, where H≥W. The optical cavities are substantially filled with a liquid including a plurality of light absorbing particles configured to move along the thickness direction in response to one or more applied signals or fields such that the movement along the thickness direction causes each of the optical cavities to transition between a substantially opaque state and a substantially transparent state. A full viewing angle of the light control film increases when the optical cavities transition from the substantially opaque state to the substantially transparent state.

17 Claims, 16 Drawing Sheets

(56)                    References Cited

U.S. PATENT DOCUMENTS

| | | | |
|---|---|---|---|
| 7,350,442 B2 | 4/2008 | Ehnes et al. | |
| 7,550,101 B2 | 6/2009 | Yang et al. | |
| 7,679,814 B2 | 3/2010 | Paolini, Jr. et al. | |
| 8,012,567 B2 | 9/2011 | Gaides et al. | |
| 8,096,667 B2 | 1/2012 | Boyd et al. | |
| 9,740,018 B1 | 8/2017 | Ouderkirk et al. | |
| 9,822,232 B2 | 11/2017 | Farrand et al. | |
| 10,113,072 B2 | 10/2018 | Inoue et al. | |
| 10,150,877 B2 | 12/2018 | Komatsu et al. | |
| 11,117,358 B2 | 9/2021 | Gotrik et al. | |
| 11,668,993 B2 * | 6/2023 | Lee ........................ | H10K 59/50 |
| | | | 349/61 |
| 2005/0174529 A1 * | 8/2005 | Fukushima ........... | G02F 1/1323 |
| | | | 349/197 |
| 2012/0064296 A1 | 3/2012 | Walker, Jr. et al. | |
| 2013/0271811 A1 * | 10/2013 | Lam ........................ | G02B 5/23 |
| | | | 359/266 |
| 2014/0232960 A1 | 8/2014 | Schwartz et al. | |
| 2020/0136086 A1 | 4/2020 | Gotrik et al. | |
| 2020/0165479 A1 | 5/2020 | De Keyzer et al. | |
| 2020/0341342 A1 | 10/2020 | Wu et al. | |
| 2021/0191223 A1 * | 6/2021 | Liao ..................... | G02B 26/005 |
| 2021/0356778 A1 * | 11/2021 | Hsieh ...................... | B32B 27/08 |
| 2022/0019007 A1 | 1/2022 | Schmidt et al. | |
| 2023/0205041 A1 * | 6/2023 | Lee ........................ | G02F 1/167 |
| | | | 359/296 |
| 2023/0367149 A1 * | 11/2023 | Bregulla .............. | G02B 17/006 |

FOREIGN PATENT DOCUMENTS

| | | | |
|---|---|---|---|
| WO | 2020225731 A1 | 11/2020 | |
| WO | 2020227280 A1 | 11/2020 | |
| WO | 2022269438 A1 | 12/2022 | |

* cited by examiner

LIGHT CONTROL FILM INCLUDING OPTICAL CAVITIES CONTAINING LIQUID

CROSS-REFERENCE TO RELATED APPLICATION

This application claims the benefit of Provisional Application No. 63/336,347, filed Apr. 29, 2022, the disclosure of which is incorporated by reference in its entirety herein.

BACKGROUND

A light control film may be generally understood to be a film configured to control the angular distribution of light transmitted through the film. A light control film can include a plurality of louvers and can control the distribution of light in a direction perpendicular to the louvers. Light control films may be used as privacy filters.

SUMMARY

In some aspects of the present description, a light control film that has a switchable full viewing angle is provided. The light control film can include a plurality of substantially parallel optical cavities that are substantially filled with liquid including light absorbing particles. The particles can be electrically charged so that the particles can be moved within the liquid of the optical cavities to change the full viewing angle of the light control film by applying an electric field. The light control film can be formed from first and second optical components assembled with one another to define the optical cavities which can be substantially filled with the liquid including the electrically charged light absorbing particles.

In some aspects of the present description, a light control film including a plurality of substantially parallel optical cavities is provided. Each of the optical cavities has a height H along a thickness direction of the light control film and a minimum lateral dimension W along an in-plane width direction orthogonal to the thickness direction, where H≥W. The optical cavities are substantially filled with a liquid including a plurality of light absorbing particles configured to move along the thickness direction in response to one or more applied signals or fields such that the movement along the thickness direction causes each of the optical cavities to transition between a substantially opaque state and a substantially transparent state. A full viewing angle of the light control film increases when the optical cavities transition from the substantially opaque state to the substantially transparent state.

In some aspects of the present description, a light control film including a plurality of substantially parallel optical cavities is provided. Each of the optical cavities has a height H along a thickness direction of the light control film and a minimum lateral dimension W along an in-plane width direction orthogonal to the thickness direction, where H≥W. Each of the optical cavities is substantially filled with a liquid including a plurality of light absorbing particles substantially uniformly dispersed therein so that the optical cavity has a first optical absorption along the width direction of the optical cavity at least a first location along the thickness direction of the optical cavity, such that in response to a first electrical signal at least a majority of the light absorbing particles in the liquid move to one or more predetermined locations within the optical cavity resulting in the optical cavity having a second optical absorption along the width direction of the optical cavity at the at least the first location along the thickness direction. The second optical absorption is smaller than the first optical absorption.

In some aspects of the present description, a light control film extending along orthogonal length and width directions of the light control film is provided. The light control film includes a plurality of optical cavities arranged along the width direction. Each of the optical cavities extend along the length direction and along a thickness direction of the light control film orthogonal to the length and width directions. Each of the optical cavities have a height H along the thickness direction and a width W along the width direction, where H≥W. The optical cavities are substantially filled with a liquid including a plurality of light absorbing particles configured to move translationally in response to one or more applied signals or fields such that the translational movement causes each of the optical cavities to transition between a substantially opaque state and a substantially transparent state. A full viewing angle of the light control film increases when the optical cavities transition from the substantially opaque state to the substantially transparent state.

These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments, it has been found that louvers (e.g., light absorbing regions) of a light control film can be provided by a plurality of substantially parallel optical cavities substantially filled with liquid including light absorbing particles configured to move (e.g., along a thickness direction of the light control film) in response to an applied (e.g., electrical) signal or field. In some embodiments, the movement of the particles causes each of the optical cavities to transition between a substantially opaque state and a substantially transparent state such that a full viewing angle of the light control film increases when the optical cavities transition from the substantially opaque state to the substantially transparent state. Such light control films can provide (e.g., electrical) switching between a privacy mode, for example, corresponding to the lower full viewing angle state and a public viewing mode, for example, corresponding to the higher full viewing angle state.

The optical cavities can have a height H along a thickness direction of the film and a minimum lateral dimension (width) W along an orthogonal width direction. In some embodiments, H is at least W. In some embodiments, a higher aspect ratio (e.g., H/W at least 10 or in another range described herein) is desired. A high aspect ratio can provide a narrow full viewing angle, for example, which may be desired in some applications such as privacy filter applications. It has been found, according to some embodiments, that a pair of optical components can be provided that have structures which can be interleaved with one another to define high aspect ratio optical cavities between adjacent structures. In some embodiments, an optical component including structures extending from a substrate is provided that can be mated to a mating component substantially identical to the optical component such that when the optical and mating components are mated to each another with the structures of the optical and mating components interleaved and disposed between the substrates of the optical and mating components, high aspect ratio optical cavities are defined between adjacent structures. It has been found that the resulting high aspect ratio optical cavities can be filled with liquid, which can include light absorbing particles, via capillary action, for example.

Figure 1A:
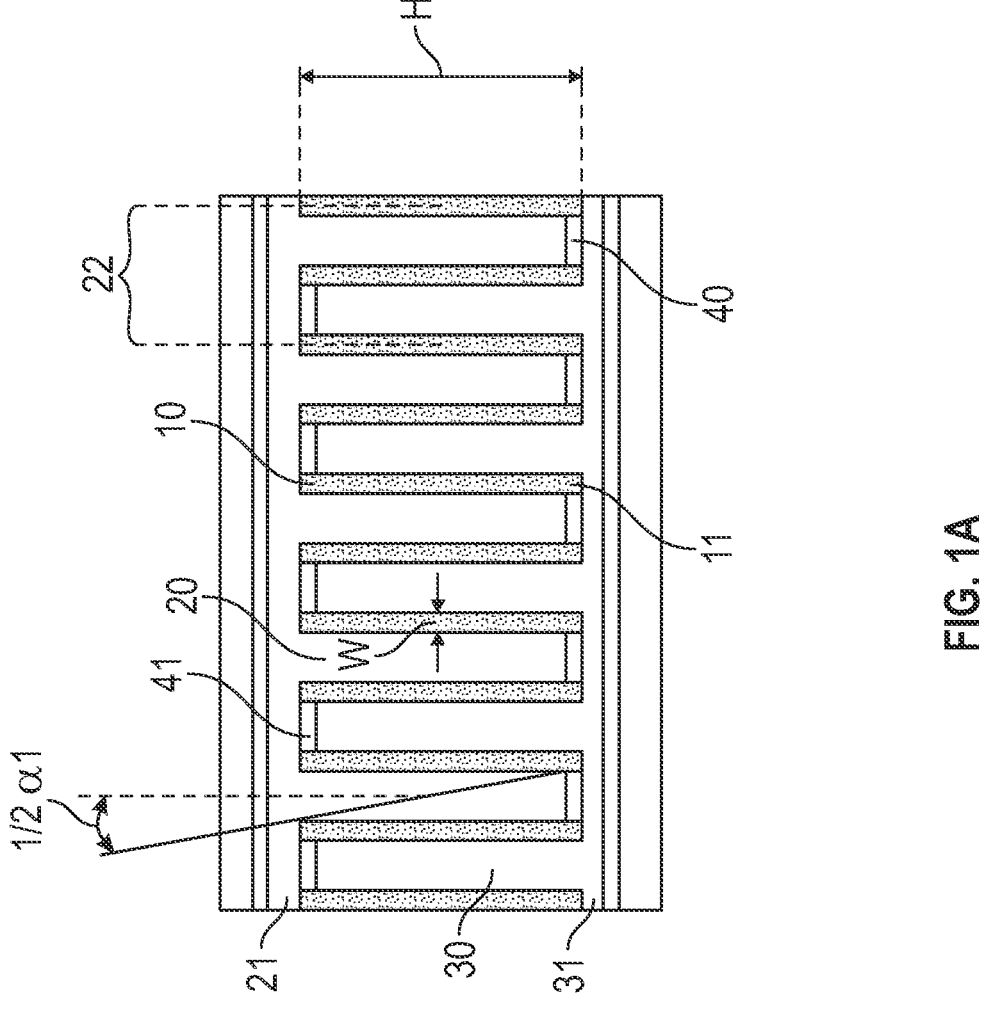
FIGS. 1A-1B are schematic cross-sectional views of a light control film, according to some embodiments.
Figure 1A:
Figure 1B:
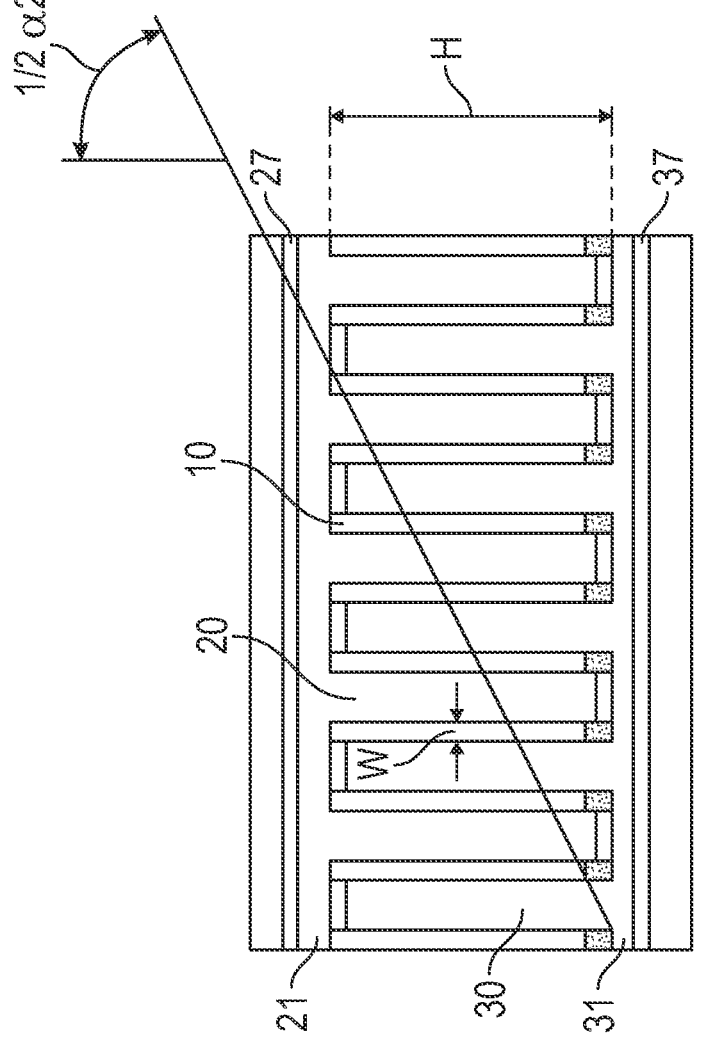

FIG. 1A is a schematic cross-sectional view of a light control film 200, according to some embodiments. The light control film 200 includes optical cavities 10 which can extend along a thickness direction (z-direction) of the film and/or which can be substantially parallel to one another. The optical cavities 10 can also extend along a length direction (y-direction) of the film. The optical cavities 10 can be substantially filled with a material 11 which can be a light absorbing material. For example, material 11 can be a liquid including light absorbing particles dispersed in the liquid. In some embodiments, as described further elsewhere herein, the optical cavities 10 can be switchable between substantially opaque and substantially transparent states due to, for example, movement of the light absorbing particles. FIG. 1B is a schematic cross-sectional view of the light control film 200 when the optical cavities 10 are in a substantially transparent state, according to some embodiments. As described further elsewhere herein, in some embodiments, the light absorbing particles are configured to move translationally in response to one or more applied signals or fields such that the translational movement causes each of the optical cavities to transition between a substantially opaque state and a substantially transparent state. The translational movement can be in the thickness direction or primarily in the thickness direction. The movement of the particles can include translational movement in the thickness direction and may also include rotational movement and/or translational movement in other directions. In some embodiments where the particles move translationally and have other modes of movement (e.g., rotational), it is the translational movement that causes the optical cavities to transition between substantially opaque and substantially transparent states. In some embodiments, the light absorbing particles are configured to move along the thickness direction in response to one or more applied signals or fields such that the movement along the thickness direction causes each of the optical cavities to transition between a substantially opaque state and a substantially transparent state. In some embodiments, a full viewing angle $\alpha 1$, $\alpha 2$ of the light control film increases when the optical cavities transition from the substantially opaque state to the substantially transparent state. In some embodiments, for each optical cavity of the plurality of optical cavities 10, when the light absorbing particles are substantially uniformly distributed in the optical cavity, the optical cavity has a first optical absorption along the width direction of the optical cavity for at least a first location along the thickness direction of the optical cavity, such that in response to a first electrical signal at least a majority (greater than 50 percent by number) of the light absorbing particles in the liquid move to one or more predetermined locations within the optical cavity resulting in the optical cavity having a second optical absorption along the width direction of the optical cavity at the at least the first location along the thickness direction, where the second optical absorption smaller than the first optical absorption. The at least the majority of the particles can be greater than about 60, 70, 80 or 90 percent of the particles.

In some embodiments, each of the optical cavities has a height H along a thickness direction (z-direction) of the light control film 200 (or other light control films described herein) and a minimum lateral dimension W (width) along an in-plane width direction (x-direction) orthogonal to the thickness direction. In some embodiments, the optical cavities 10 extend along an in-plane length direction (y-direction) orthogonal to the height and in-plane width directions and are arranged (e.g., regularly) along the width direction. In some embodiments, each of the optical cavities has a maximum dimension in a cross-section orthogonal to the length direction substantially equal to the height H along the thickness direction. In some embodiments, the light control film 200 (or other light control films described herein) extends along orthogonal length and width directions (y- and x-directions) of the light control film, and includes a plurality of optical cavities 10 arranged along the width direction, where each of the optical cavities 10 extend along the length direction and along a thickness direction (z-direction) of the light control film orthogonal to the length and width directions, and where each of the optical cavities have a height H along the thickness direction and a width W along the width direction.

In some embodiments, H (height) is at least about 1, 2, 3, 5, 7, 10, 20, 30, 40, 50, 60, 70, 80, 90, or 100 times W (width and/or minimum lateral dimension). H/W can be, for example, up to about 1000, 500, 400, 300 or 200. For example, H/W can be in a range of about 2 to about 200. In some embodiments, H is at least about 20, 30, 40, 50, 60, 70, 80, 90, or 100 micrometers. H may be, for example, no more than about 500, 400, 300, 250, 200, 175, or 150 micrometers. For example, H may be in a range of about 40 micrometers to about 200 micrometers. In some embodiments, W is at least about 100, 200, 400, 500, 600, 800, 1000, 1200, 1400, 1600, 1800, or 1900 nm. W may be, for example, no more than about 100, 80, 60, 40, 20, 15, 10, 8, 6, 5, 4, 3, or 2 micrometers. For example, W may be in a range of about 400 nm to about 10 micrometers or about 500 nm to about 5 micrometers. In some embodiments, it is desired that the optical cavities 10 have a high aspect ratio (H/W) which can be understood to be the height divided by the width of the optical cavities. For example, a high aspect ratio can result in a narrow full viewing angle which may be desired in privacy filter applications, for example. In some embodiments, a pair of optical components are provided that have structures (e.g., protrusions extending along the height and length directions) which can be interleaved with one another to define high aspect ratio optical cavities. Generally, a small W and large H/W is desired for providing a small full viewing angle while W is generally desired to be sufficiently large that the material 11 provides substantial optical absorption across the width of the optical cavity.

Figure 2:
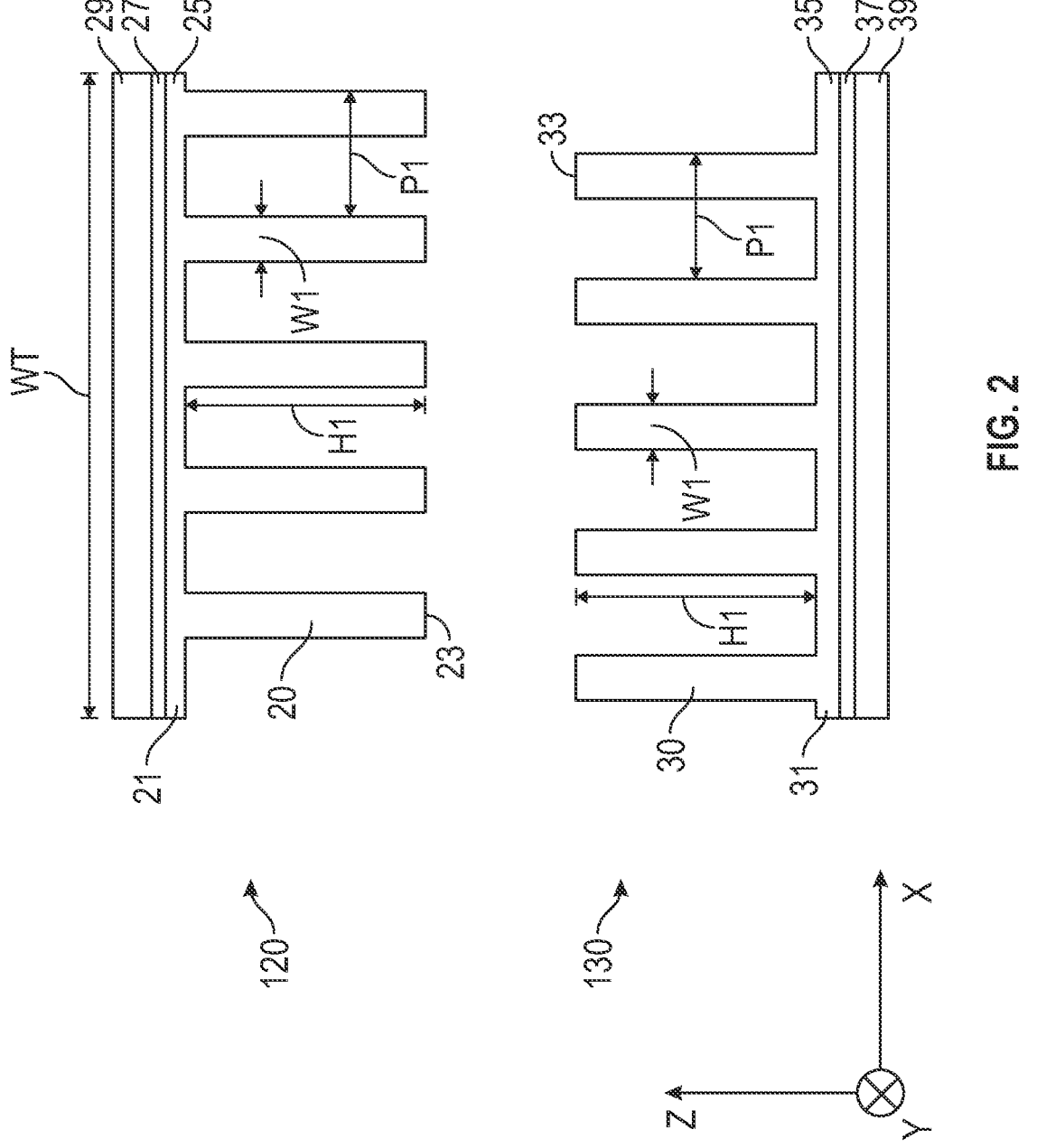
FIG. 2 is a schematic cross-sectional view of first and second optical components, according to some embodiments.

FIG. 2 is a schematic cross-sectional view of first and second optical components 120 and 130, according to some embodiments. The first and second optical components 120 and 130 are schematically shown as spaced apart along the z-direction in FIG. 2. In some embodiments, the first and second optical components 120 and 130 are brought together (moving the components towards one another along the z-direction) to provide the light control film 200. In some embodiments, the first and second optical components 120 and 130 have a substantially same size and shape. In other embodiments, the first and second optical components have respective first and second structures having different widths (see, e.g., FIG. 3), for example. After the first and second optical components 120 and 130 are brought together, a liquid material 11 may be placed in the resulting optical cavities 10 via capillary action. Alternatively, or in addition, a vacuum and/or positive pressure can be applied to drive the liquid into the cavities. The liquid can be sealed in the light control film by applying sealing layers along edges at opposite sides (along y-direction) of the film. Each of the sealing layers can be applied as a coating that is subsequently (e.g., thermally or radiation) cured, for example. Alternatively, the edges can be heat sealed or ultrasonically welded. As an alternative to filling the channels via capillary action, the channels can be filled during the process of laminating the optical components by applying the fluid between the optical components prior to bringing the optical components together. In some embodiments, where switching between different viewing angle modes is not desired, the liquid can be a curable composition that is cured after the liquid has been added to the optical cavities. In some such embodiments, or in other embodiments, the sealing step can be omitted.

In some embodiments, the light control film 200 includes first and second optical components 120 and 130 including respective pluralities of first and second structures 20 and 30 formed on, and extending from, respective first and second substrates 21 and 31. The first and second optical components can be assembled so that the first and second structures 20 and 30 are disposed between the first and second substrates 21 and 31 and interleaved to form a plurality of pairs 22 of adjacent first and second structures, where, for each of at least some of the pairs, the adjacent first and second structures define an optical cavity 10 therebetween substantially filled with a (e.g., light absorbing) material 11 which can include a plurality of light absorbing particles (see, e.g., particles 12 schematically illustrated in FIGS. 8A-8C). The material 11 may be a liquid including the plurality of light absorbing particles.

In some embodiments, a first bonding layer 40 bonds a top portion 23 of each of the first structures 20 to the second substrate 31. In some embodiments, a second bonding layer 41 bonds a top portion 33 of each of the second structures 30 to the first substrate 21. Any suitable adhesive may be used for the bonding layers. For examples, the bonding layers can be formed from commercially available optically clear adhesives such as those available from 3M Company (St. Paul, MN). The adhesives may be applied to the top portions 23, 33 of the structures before assembly of the optical components. The adhesives may be partially cured after coating the top portions and then fully cured after assembly. The bonding layers 40, 41 may be radiation cured (meth)acrylate layers, for example. The bonding layers 40, 41 may alternatively be omitted and a material 11 (e.g., comprising a plurality of light absorbing particles) can bond the first and second optical components together. In some embodiments, the plurality of first structures 20 directly contacts the second substrate 31, and the plurality of second structures 30 directly contacts the first substrate 21 (see, e.g., FIGS. 3-6). In some embodiments, the material 11 comprises a polymer comprising the plurality of light absorbing particles dispersed therein. In some embodiments, the polymer is crosslinked (e.g., when switching between viewing modes is not desired) and the polymer is used to bond the first and second components together. In embodiments where switching between viewing modes is not desired, the light absorbing material 11 can include dyes, for example, instead of (e.g., charged) light absorbing particles, for example. In some embodiments, the material 11 includes a combination of light absorbing dye(s) and particle(s).

In some embodiments, the first substrate 21 includes a first polymeric layer 25 where the plurality of first structures 20 are formed on, and extends from, the first polymeric layer 25, and a first substantially transparent electrically conductive layer 27 disposed on the first polymeric layer 25 opposite the plurality of first structures 20. In some embodiments, the first substrate 21 further includes a first protective layer 29 disposed on the first substantially transparent electrically conductive layer 27 opposite the first polymeric layer 25. In some embodiments, the first protective layer 29, the first polymeric layer 25 and the first substantially transparent electrically conductive layer 27 are substantially coextensive with one another. In some embodiments, a first unitary element 20, 21 includes the first polymeric layer 21 and the plurality of first structures 20. In some embodiments, the second substrate 31 includes a second polymeric layer 35 where the plurality of second structures 30 are formed on, and extends from, the second polymeric layer 35; and a second substantially transparent electrically conductive layer 37 disposed on the second polymeric layer 35 opposite the plurality of second structures 30. In some embodiments, the second substrate 31 further includes a second protective layer 39 disposed on the second substantially transparent electrically conductive layer 37 opposite the second polymeric layer 35. In some embodiments, the second protective layer 39, the second polymeric layer 35 and the second substantially transparent electrically conductive layer 37 are substantially coextensive with one another. In some embodiments, a second unitary element 30, 31 includes the second polymeric layer 31 and the plurality of second structures 30. In some embodiments, one or both of the transparent electrically conductive layers 27 and 37 is or includes or is replaced with a plurality of electrically conductive ribbons as described further elsewhere herein.

Layers or elements can be described as substantially coextensive with each other if at least about 60% by area of each layer or element is coextensive with at least about 60% by area of each other layer or element. Here, area refers to the area of a major surface of the layer or element. In some embodiments, for layers or elements described as substantially coextensive, at least about 70%, or at least about 80%, or at least about 90% by area of each layer or element is coextensive with at least about 70%, or at least about 80%, or at least about 90% by area of each other layer or element. Layers or elements can be described as substantially coextensive with each other may be coextensive with each other.

In some embodiments, the structures 20 and 30 have a substantially same size and shape as schematically illustrated in FIG. 2. For example, in some embodiments, the structures 20 and 30 have a substantially same height H1 along a thickness direction (z-direction), a substantially same width W1 which can be a minimum lateral dimension along a width direction orthogonal to the thickness direction, and the structures 20 and 30 can be periodically arranged at a substantially same pitch P1 along the width direction. In other embodiments, the structures 20 can differ from the structures 30. For example, the structures 20 and 30 can have a substantially same height H1 and pitch P1 but have different widths as schematically illustrated in FIG. 3.

Figure 3:
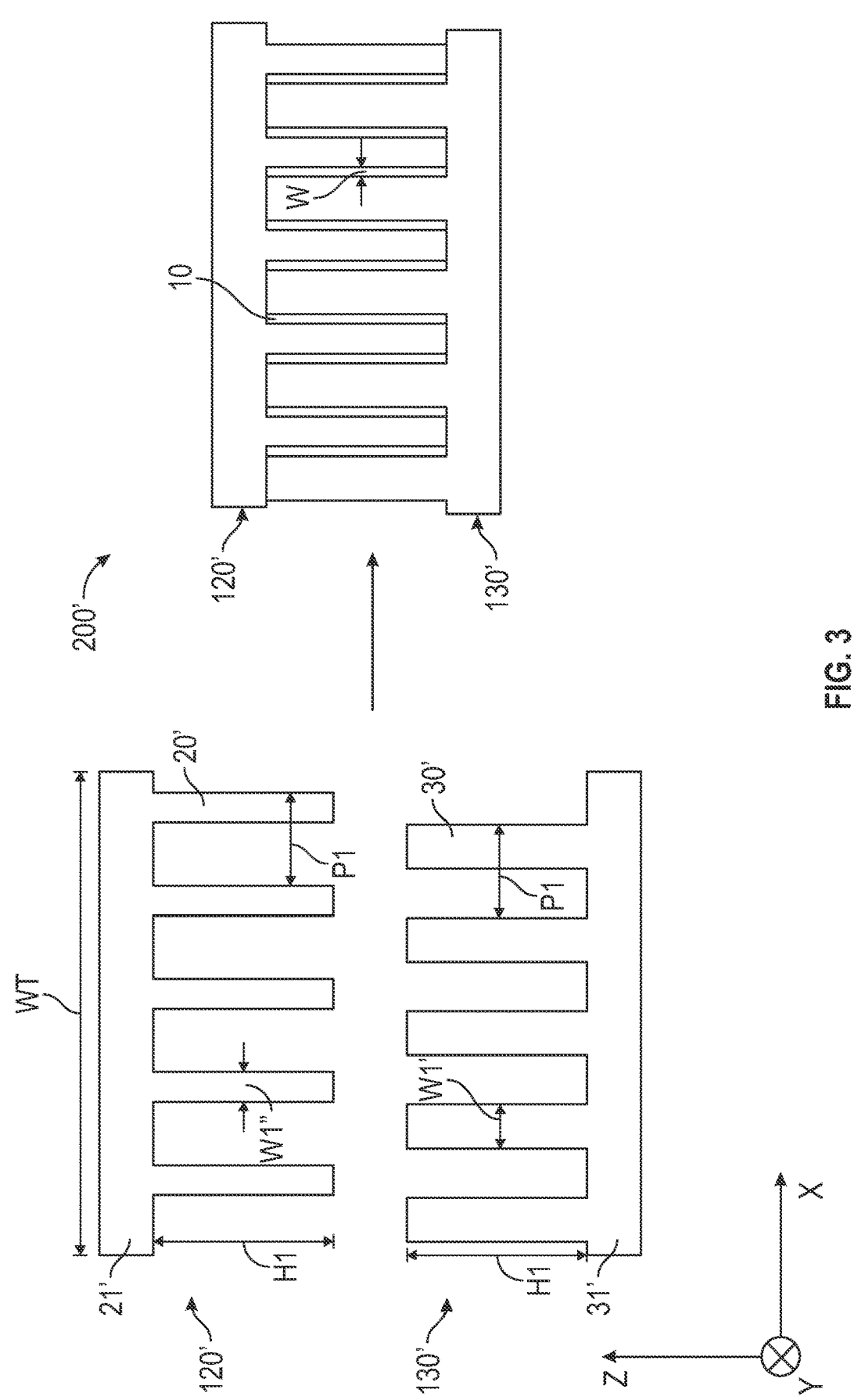
FIGS. 3-7 are schematic cross-sectional views of optical components and assemblies of optical components, according to some embodiments.

FIG. 3 is a schematic cross-sectional view of first and second optical components 120' and 130' and of an assembly 200' of the optical components, according to some embodiments. The first and second optical components 120' and 130' can correspond to the first and second optical components 120 and 130. The first and second optical components 120' and 130' include respective pluralities of first and second structures 20' and 30' formed on, and extending from, respective first and second substrates 21' and 31'. In some embodiments, the structures 20' and 30' have a substantially same height H1 along the thickness direction (z-direction) and can be periodically arranged at a substantially same pitch P1 along the width direction (x-direction). In some embodiments, the structures 30' have an average width W1" and the structures 20' have an average width W1' wherein W1"<W1'. The first and second optical components 120' and 130' can be mated to form assembly 200' including optical cavities 10 which can be substantially filled with a liquid as described further elsewhere herein to provide a light control film. Adhesive (e.g., 40, 41) may be included to bond the first and second optical components 120' and 130' together as schematically illustrated in FIGS. 1A-1B, for example. In some embodiments, (P1−W1'−W1")/2 is the average width W of the optical cavities 10.

In some embodiments, the second substrate (e.g., 31, 31') includes a plurality of depressions (see, e.g., FIGS. 4-7) configured to receive top portions (e.g., 23) of the first structures (e.g., 20, 20'). In some embodiments, the top portions (e.g., 23) of the first structures and at least portions of the depressions of the second substrate have substantially complementary shapes (e.g., so that the top portions and depressions fit together to facilitate alignment). In some embodiments, the first substrate (e.g., 21, 21') includes a plurality of depressions configured to receive top portions (e.g., 33) of the second structures (e.g., 30, 30'). In some embodiments, the top portions of the first and second structures and the depressions of the first and second substrates are configured to align the first and second optical components to one another. In some embodiments, the first structures extend along a length direction and are arranged along an orthogonal width direction, and where in at least one cross-section orthogonal to the length direction, at least some of the top portions of the first structures are rounded, substantially triangular, or substantially rectangular (see, e.g., FIGS. 4-7). In some embodiments, top portions of the first structures are rounded and the second substrate includes a plurality of rounded depressions receiving the top portions. In some embodiments, top portions of the second structures are rounded and the first substrate includes a plurality of rounded depressions receiving the top portions of the second structures. More generally, in some embodiments, the first and second optical components comprise a plurality of features (e.g., 423, 424, 433, 434; or 523, 524, 533, 534; or 623, 624, 633, 634; or 723, 724, 733, 734) configured to align the first and second optical components to one another. In some embodiments, the first and second structures extend along a length direction and are arranged along an orthogonal width direction, and in at least one cross-section orthogonal to the length direction, at least some of the features are rounded, substantially triangular, or substantially rectangular.

FIGS. 4-7 are schematic cross-sectional views of respective first (470, 570, 670, 770) and second (480, 580, 680, 780) optical components and of respective assemblies 400, 500, 600, 700 of the optical components, according to some embodiments. The first optical components 470, 570, 670, 770 include respective substrates 421, 521, 621, 721 and respective pluralities of structures 420, 520, 620, 720 extending from first major surfaces 426, 526, 626, 726 of the substrates. The second optical components 480, 580, 680, 780 include respective substrates 431, 531, 631, 731 and respective pluralities of structures 430, 530, 630, 730 extending from first major surfaces 436, 536, 636, 736 of the substrates. The first major surface 426, 526, 626, 726 of the substrate 421, 521, 621, 721 includes a plurality of alignment features 424, 524, 624, 725 where each alignment feature of the plurality of alignment features is configured to engage with a corresponding structure 430, 530, 630, 730 of the other optical component. The first major surface 436, 536, 636, 736 of the substrate 431, 531, 631, 731 includes a plurality of alignment features 434, 534, 634, 734 where each alignment feature of the plurality of alignment features is configured to engage with a corresponding structure 420, 520, 620, 720 of the other optical component. The alignment features typically engage with a top portion of the corresponding structure. For example, each alignment feature of the plurality of alignment features 424, 524, 624, 724 can be configured to engage with a top portion 433, 533, 633, 733 of a corresponding structure 430, 530, 630, 730 of the other optical component. Similarly, each alignment feature of the plurality of alignment features 434, 534, 634, 734 can be configured to engage with a top portion 423, 523, 623, 723 of a corresponding structure 420, 520, 620, 720 of the other optical component.

Any of the optical components of FIGS. 3-7 can be unitary polymeric components. The optical components of FIGS. 3-7 can optionally include other layer(s), such as a substantially transparent electrically conductive layer, as schematically illustrated in FIG. 2, for example. The unitary polymeric component can be formed by casting and curing the polymeric component on a carrier substrate (e.g., a polyethylene terephthalate or polycarbonate substrate). The cast and cure process can form the structures 420, 520, 620, 720 extending from a substrate 421, 521, 621, 721 formed as a land (e.g., corresponding to layer 25) formed on the carrier substrate (e.g., corresponding to layers 27 and 29). Other optical components described herein can be made similarly The structures and alignment features can be formed in the cast and cure process by using a tool having the negative of these structures and features. Suitable cast and cure processes and suitable (meth)acrylate materials, for example, that can be used in such processes are described in U.S. Pat. Appl. Pub. Nos. 2022/0019007 (Schmidt et al.) and 2012/0064296 (Walker, JR. et al.) and in U.S. Pat. No. 8,096,667 (Boyd et al.); U.S. Pat. No. 5,175,030 (Lu et al.); and U.S. Pat. No. 5,183,597 (Lu), for example, and may include the steps of (a) preparing a polymerizable composition; (b) depositing the polymerizable composition onto a master negative microstructured molding surface (e.g., tool) in an amount barely sufficient to fill the cavities of the master; (c) filling the cavities by moving a bead of the polymerizable composition between a base layer (e.g., a preformed carrier substrate) and the master, at least one of which is flexible; and (d) curing the composition. The tool may be fabricated using any suitable fabrication method such as those described in U.S. Pat. No. 7,350,442 (Ehnes et al.); U.S. Pat. No. 7,328,638 (Gardiner et al.), and U.S. Pat. No. 6,322,236 (Campbell et al.), for example.

The size and shape of the first and second optical components can be substantially the same or can be different. In some embodiments, the structures of the first and second optical components have a substantially same height H1 and a substantially same pitch P1. In some such embodiments, or in other embodiments, the structures of the first and second optical components can have a substantially same width W1 (see, e.g., FIG. 2) or can have different widths W1″, W′ (see, e.g., FIG. 3). Substantially same size and shape includes nominally the same size and shape and includes variations in shape or size that are small compared to other relevant dimensions. For example, if the structures of the first optical component have a curvature small (e.g., less than 20, 10, or 5 percent) compared to an inverse if the average height H1, the structures of the second optical component can be complementary curved so that the structures can be interleaved, and the components can be considered to have substantially same shapes and sizes Similarly, substantially same dimension (e.g., length, width, height) includes nominally the same dimension and includes variations in the dimension that are small compared to other relevant length scales. In some embodiments, the first and second optical components are substantially identical. Substantially identical means that the components have corresponding structures and substrates having substantially same shape and sizes.

Figure 6:
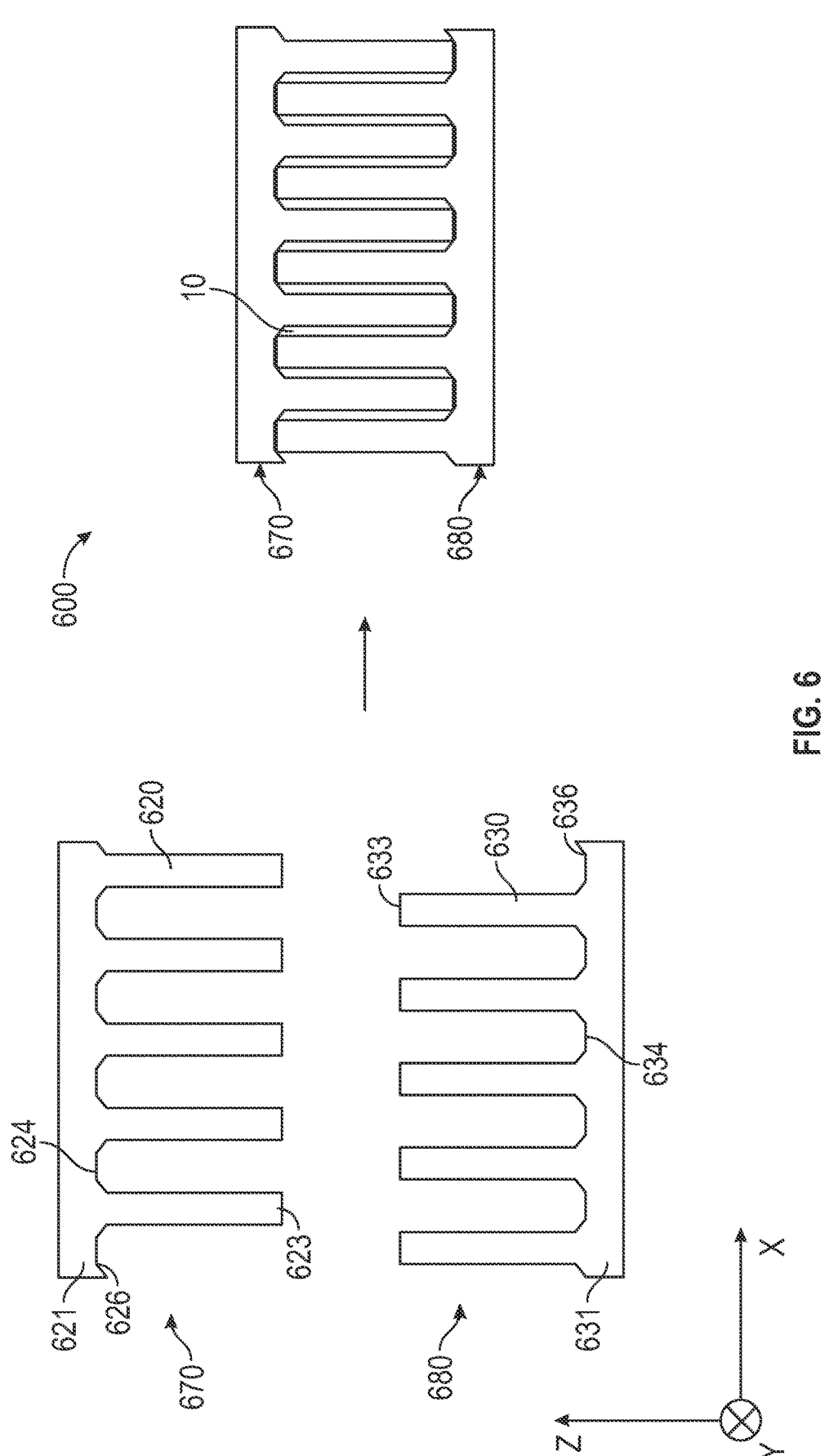
Figure 7:
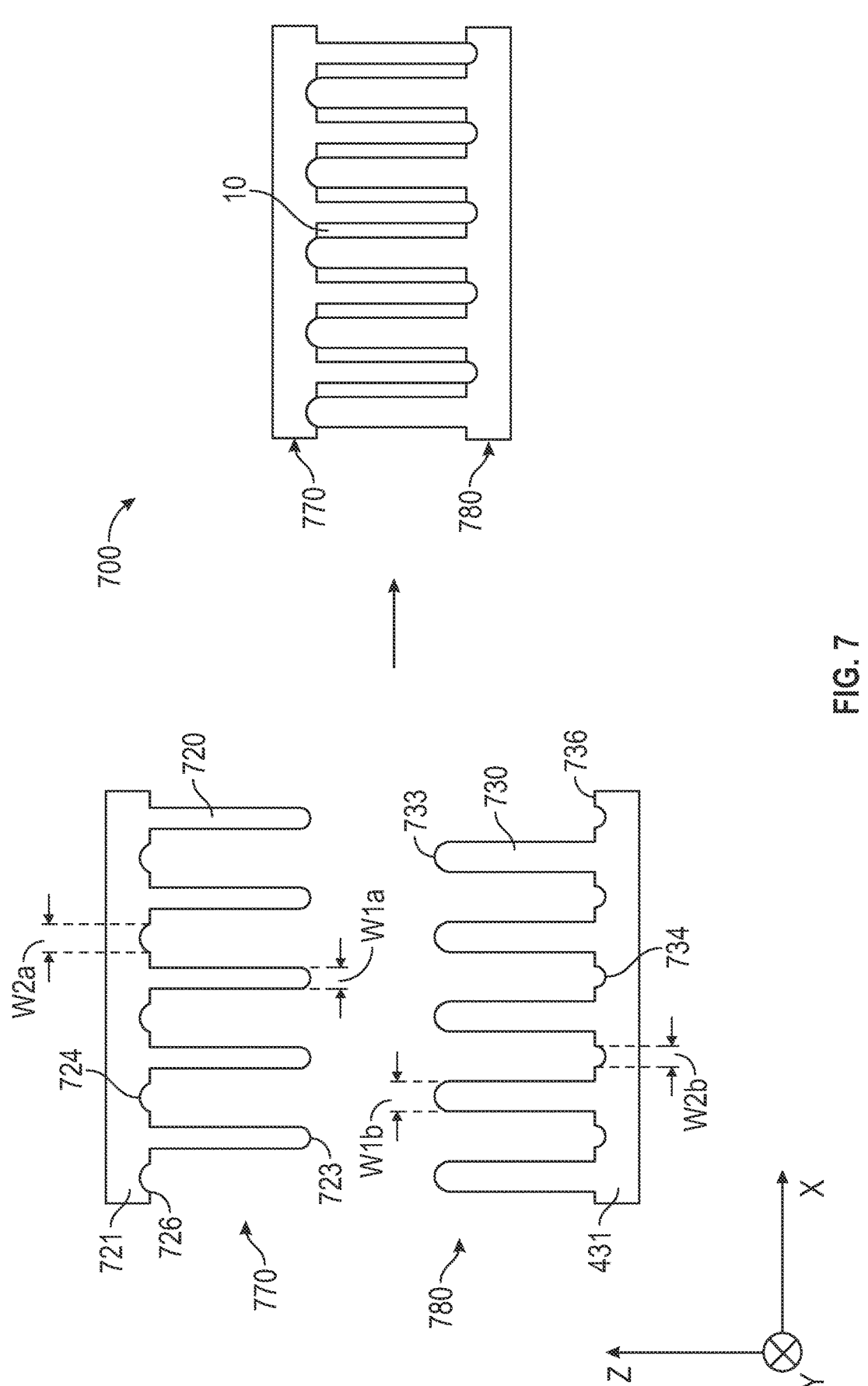

In some embodiments, an optical component (e.g., 470, 570, 670, 770) includes a substrate (e.g., 421, 521, 621, 721) extending along orthogonal length and width directions (y- and x-directions) of the substrate; and a plurality of structures (e.g., 420, 520, 620, 720) formed on a first major surface (e.g., 426, 526, 626, 726) of the substrate and extending from the first major surface along a thickness direction (z-direction) of the optical component. The thickness direction is orthogonal to the length and width directions. The structures extend along the length direction and are arranged substantially periodically (e.g., nominally periodically or periodically up to variations less than about 20, 10, or 5 percent of the average pitch) along the width direction at an average pitch P1. The structures have an average width W1 along the width direction and an average height H1 along the thickness direction. In some embodiments, $H1/(P1-2W1) \geq 1$. The first major surface of the substrate includes a plurality of alignment features (e.g., 424, 524, 624, 724). Each alignment feature of the plurality of alignment features is configured to engage with a corresponding structure (e.g., 430, 530, 630, 730) of a mating component (e.g., 480, 580, 680, 780) when the optical and mating components are mated to each another (e.g., to form assembly 400, 500, 600, 700) with the structures of the optical and mating components interleaved and disposed between the substrates of the optical and mating components. The plurality of alignment features is configured to align the optical and mating components along at least the width direction. The mating component may be substantially identical to the optical component (as schematically illustrate in FIGS. 4-6, for example) or may be substantially identical up to average widths of the structures and alignment features of the optical and mating optical components (as schematically illustrated in FIG. 7, for example). For example, the structures of the mating component can be wider (resp., narrower) than those of the optical component while the alignment features of the mating component can be narrower (resp., wider) than those of the optical component in order to accommodate the narrower (resp., wider) structures of the optical component.

Figure 4:
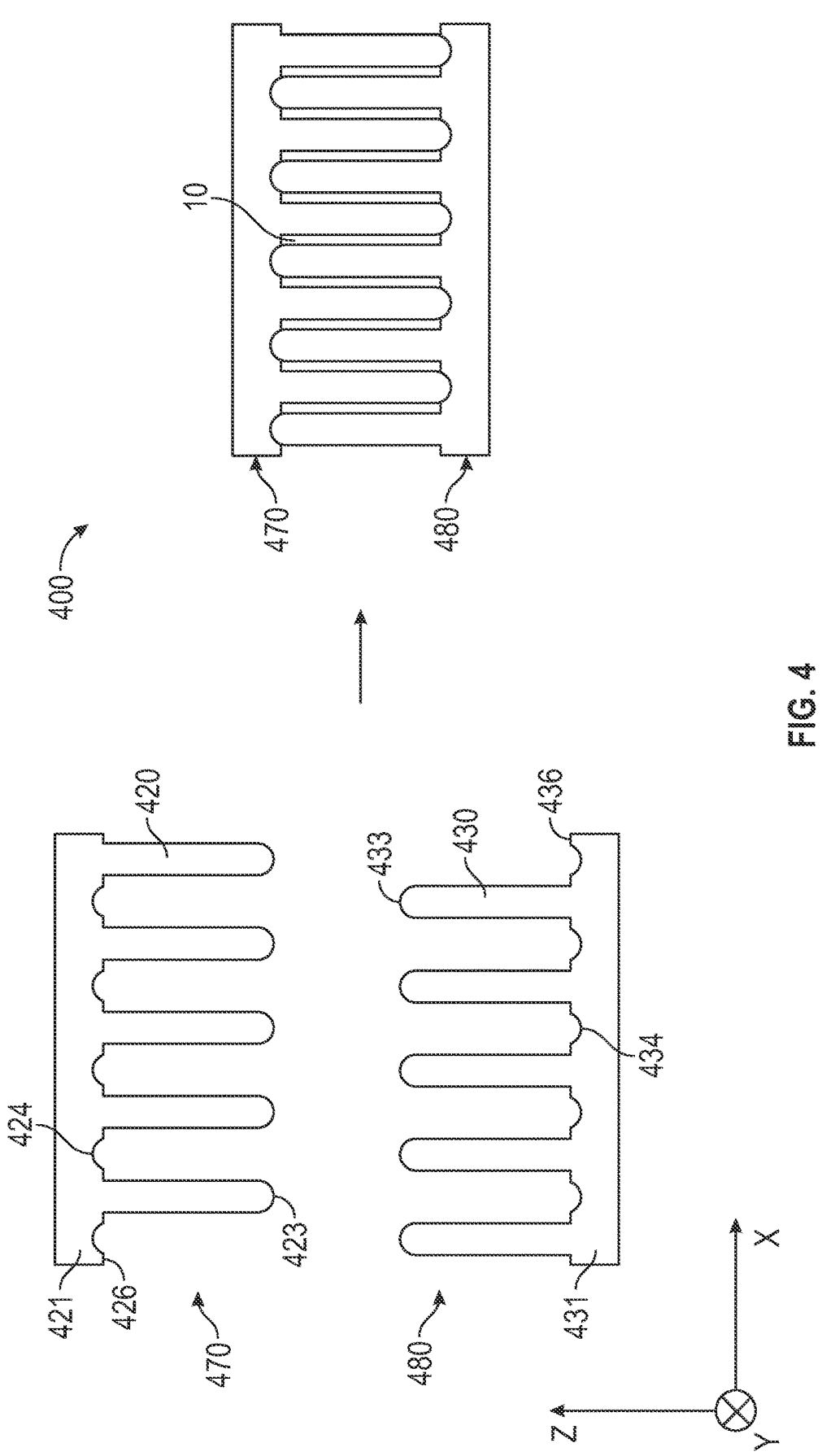
Figure 5:
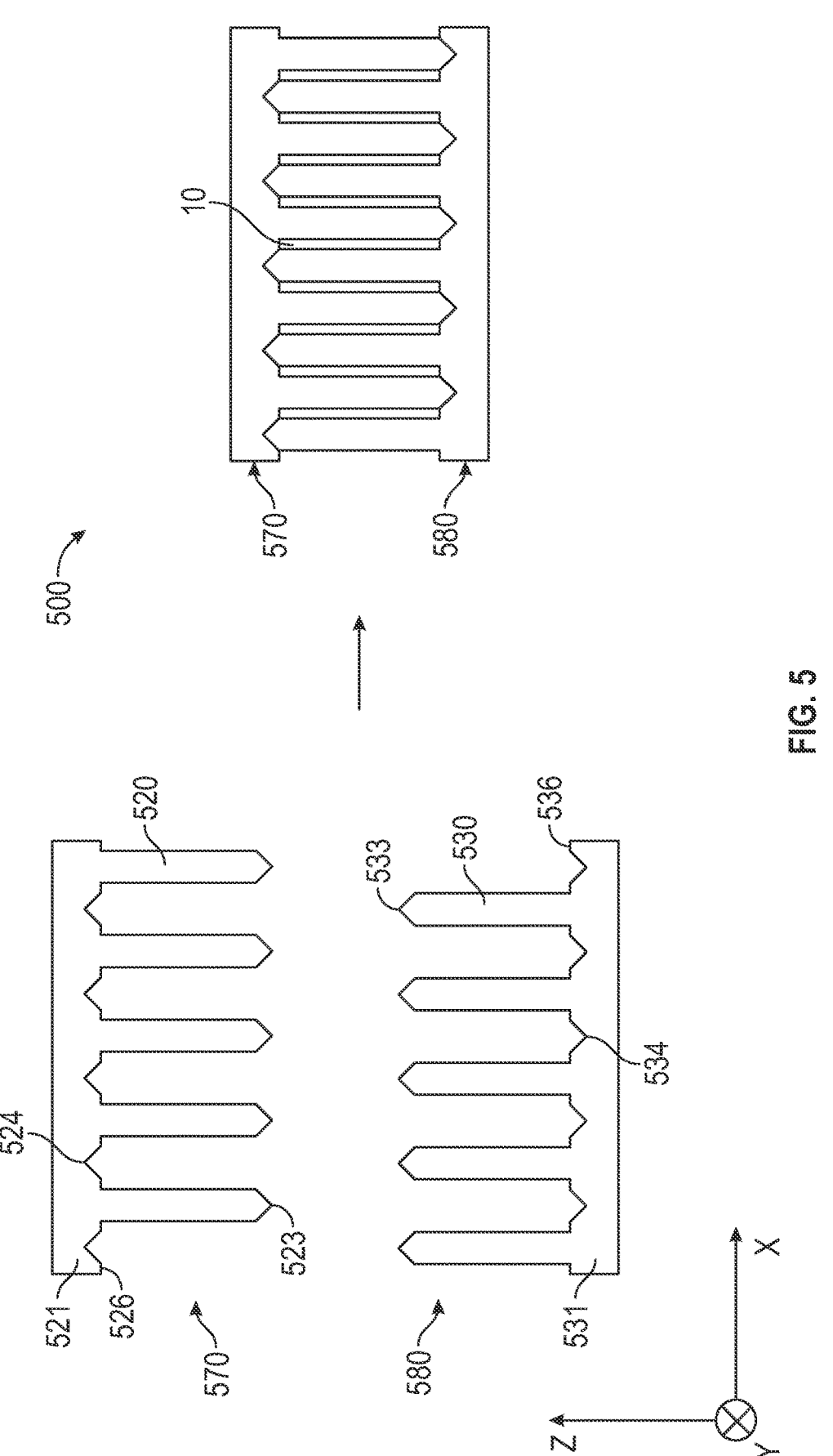

In some embodiments, an optical component (e.g., 470, 570, 670, 770) includes a substrate (e.g., 421, 521, 621, 721) extending along orthogonal length and width directions (y- and x-directions) of the substrate; and a plurality of structures (e.g., 420, 520, 620, 720) formed on a first major surface (e.g., 426, 526, 626, 726) of the substrate and extending from the first major surface along a thickness direction (z-direction) of the optical component. The thickness direction is orthogonal to the length and width directions. In some embodiments, the first major surface of the substrate includes a plurality of alignment features (e.g., 424, 524, 624, 724), where each alignment feature of the plurality of alignment features is configured to engage with a corresponding structure of a mating component (e.g., 480, 580, 680, 780) including a plurality of structures (e.g., 430, 530, 630, 730) extending from a substrate along the thickness direction when the optical and mating components are mated to each another with the structures of the optical and mating components interleaved and disposed between the substrates of the optical and mating components. The structures of the optical and mating components have a substantially same (e.g., to within about 5, 3, 2, 1 percent) average height H1 along the thickness direction and extending along the length direction and arranged substantially periodically along the width direction at a substantially same (e.g., to within about 5, 3, 2, 1 percent) average pitch P1. The structures of the optical and mating components have respective average widths W1a and W1b along the width direction. W1a and W1b can be substantially the same width as schematically illustrated in FIGS. 4-6. Alternatively, W1a and W1b can differ as schematically illustrated in FIG. 7 where W1a<W1b. In other embodiments, W1a>W1b. In some embodiments, W1a can correspond to one of W1′ and W1″ of FIG. 3 and W1b can correspond to the other of W1′ and W1″ of FIG. 3. In some embodiments, $0.7 \leq W1a/W1b \leq 1.3$, or $0.8 \leq W1a/W1b \leq 1.2$, or $0.85 \leq W1a/W1b \leq 1.15$, or $0.9 \leq W1a/W1b \leq 1.1$, for example. In some embodiments, W1a=W1b. In some embodiments, $H1/(P1-W1a-W1b) \geq 1$.

The alignment features of the optical and mating components can have respective average widths W2a and W2b which may be the same or different and may be sized corresponding to the average widths of the structures received by the alignment features. The average widths of the alignment features can be understood to be the average over the alignment features of the largest dimension of the alignment features in the width direction (x-direction). In FIG. 7, W2a>W2b corresponding to W1a being less than W1b. In other embodiments, W2a<W2b corresponding to W1a being greater than W1b. In still other embodiments, W1a=W1b and W2a=W2b.

The optical and mating components can be substantially identical or substantially identical except that the structures of the mating component can have different average widths than the structures of the optical component and alignment features of the mating optical component can have different average widths than the alignment features of the optical component. The shapes of the top portions 723, 733 of the structures 720, 730 and the corresponding shapes of the alignment features 734, 724 of FIG. 7 can be different as schematically illustrated in FIGS. 4-6, for example, or other shapes may be used. The plurality of alignment features is configured to align the optical and mating components along at least the width direction.

In some embodiments, the alignment features (e.g., 424, 524, 624, 724) and the structures (e.g., 420, 520, 620, 720) of the optical component alternate along the width direction. In some embodiments, the plurality of alignment features is configured to align the optical and mating components such that each structure of a plurality of the structures of the mating component is substantially centered along the width direction between a pair of adjacent structures of the optical component. In some embodiments, the alignment features extend along substantially (e.g., at least 70, 80, 90, or 95 percent of) an entire length (y-direction) of the optical component and aligns and centers the optical and mating components in the width direction along the length. In some embodiment, the alignment features align the optical and mating components along the thickness direction by limiting movement along the thickness direction.

In some embodiments, the plurality of alignment features of the optical component includes a plurality of depressions configured to receive top portions of the structures of the mating components. The depressions and top portions may have generally complementary shapes as schematically illustrated in FIGS. 4-6, for example. In some embodiments, the structures extend from the substrate to top portions of the structures where in a cross-section orthogonal to the length direction, at least some of the top portions are rounded (see, e.g., FIGS. 4 and 7), or substantially triangular (see, e.g., FIG. 5), or substantially rectangular (see, e.g., FIG. 6). Combinations of different shapes of the top portions and corresponding different shapes of the alignment features may be used.

In some embodiments, the substrate and plurality of structures are substantially optically transparent. For example, the optical component can be made by a cast and cure process using a substantially optically transparent acrylate resin to form the structures and the substrate or a top layer (e.g., corresponding to layer 25) of the substrate. The substrate may further include a substantially transparent electrically conductive layer (e.g., corresponding to layer 27) and a carrier or protective substrate layer (e.g., corresponding to layer 29). Suitable substantially transparent electrically conductive layers include, for example, transparent electrically conductive oxide layers (e.g., indium tin oxide (ITO) layers, aluminum-doped zinc oxide (AZO) layers, or indium-doped cadmium oxide layers), layers of electrically conductive extended particles (e.g., silver nanowires and/or carbon nanotubes), and transparent electrically conductive polymer layers (e.g., poly(3,4-ethylene-dioxythiophene) (PEDOT), PEDOT doped with poly(styrene sulfonate) (PEDOT:PSS), or poly(4,4-dioctyl cyclopentadithiophene) doped with 2,3-dichloro-5,6-di-cyano-1,4-benzoquinone (DDQ) or iodine). A substantially optically transparent layer or element generally has an optical transmittance for substantially normally incident light and at least one wavelength in a range of about 420 to 680 nm of greater than 50 percent. In some embodiments, a substantially optically transparent layer or element (e.g., a structure or substrate of an optical component or an optical cavity of a light control film) has an average an optical transmittance for substantially normally incident light and for a wavelength range of about 420 to 680 nm of greater than 50, 60, 70, or 80 percent at least when measured across a minimum width or thickness of the element or layer (e.g., measured in the x-direction for the structures and the z-direction for the substrate). A substantially optically opaque layer or element generally has an optical transmittance for substantially normally incident light and the at least one wavelength in a range of about 420 to 680 nm of less than 50 percent. In some embodiments, a substantially optically opaque layer or element (e.g., a structure or substrate of an optical component or an optical cavity of a light control film) has an average an optical transmittance for substantially normally incident light and for a wavelength range of about 420 to 680 nm of less than 50, 60, 70, or 80 percent when measured across a minimum width or thickness of the element or layer (e.g., measured in the x-direction for the structures and the z-direction for the substrate).

In some embodiments, $H1 \geq P1 - 2W1 > 0$. In some embodiments, $H1 \geq P1$ or $H1 \geq 1.25$ P1 or $H1 \geq 1.5$ P1. In some embodiments, $H1/(P1-2W1) \geq 1$, 2, 3, 4, 5, 10, 15, 20, 25, 30, 35, 40, 45, or 50. P1–2W1 corresponds to 2 times the average width W of the resulting optical cavities, so $H1/(P1-2W1) \geq 1$ corresponds to $H/W \geq 2$, for example, neglecting any change in height of the optical cavities due to the thickness of any bonding layers 40, 41. In some embodiments, P1–2W1 is at least about 100, 200, 400, 500, 600, 800, 1000, 1200, 1400, 1600, 1800, or 2000 nm. P1–2W1 may be, for example, no more than about 100, 80, 60, 40, 20, 15, 10, 8, 6, 5, 4, or 3 micrometers. For example, P1–2W1 may be in a range of about 500 nm to about 5 micrometers. In some embodiments, H1 is at least about 20, 30, 40, 50, 60, 70, 80, 90, or 100 micrometers. H1 may be, for example, no more than about 500, 400, 300, 250, 200, 175, or 150 micrometers. For example, H1 may be in a range of about 40 micrometers to about 200 micrometers. In some embodiments, 500 µm $H1 \geq 5(P1-2W1) \geq 1$ µm, or 300 µm $\geq H1 > 10$ (P1–2W1)$\geq 5$ µm, or 250 µm $\geq H1 \geq 15(P1-2W1) \geq 10$ µm, or 200 µm $\geq H1 > 20(P1-2W1) \geq 15$ µm, or 150 µm $\geq H1 > 25(P1-2W1) \geq 20$ µm. In any of the relations involving 2W1, 2W1 may be replaced by W1a+W1b when the optical and mating components have structures with different widths. For example, in some embodiments, $H1/(P1-W1a-W1b) \geq 1$, 2, 3, 4, 5, 10, 15, 20, 25, 30, 35, 40, 45, or 50.

In some embodiments, W1 is at least about 1, 2, 3, 5, 7, 10, 15, or 20 micrometers. W1 may be, for example, no more than about 200, 150, 100, 90, 80, 70, 60, 50, or 40 micrometers. For example, W1 may be in a range of about 5 micrometers to about 100 micrometers. W1a and W1b may independently be in any of these ranges for W1. Similarly, the average widths of the alignment features (e.g., W2a, W2b) can be in any of these ranges.

In some embodiments, the optical components are assembled to form a light control film (e.g., corresponding to light control film 200). For example, the optical cavities 10 of the assemblies 200', 400, 500, 600 can be filled with a liquid from the sides (ends along the y-direction) of the assembly. The liquid can be optically absorptive. For example, the liquid can include a plurality of light absorbing particles. In some embodiments, the liquid can be a resin. In some embodiments, (e.g., where switching between states is not desired) the resin can be crosslinked. In some embodiments, the particles are configured to move translationally in response to an applied field. The translational movement can be along the thickness direction. In some embodiments, the particles are configured to move along the thickness direction in response to an applied field. For example, the particles can be electrophoretic particles. In some embodiments, other viewing angle switching methods are employed in light control films formed from first and second optical components. For example, the switching methods described in U.S. Pat. Appl. Pub. No. 2014/0232960 (Schwartz et al.) may be used. The light absorbing particles can be or include electrically charged particles as described further elsewhere herein. The resulting light control film may be described as including first and second optical components (e.g., the first and second optical components can be the first and second optical components shown in FIGS. 2-6) where the structures of the first and second optical components are disposed between the substrates of the first and second optical components and interleaved to form pairs of adjacent structures, where, for each of at least some of the pairs, the adjacent structures define an optical cavity 10 therebetween substantially filled with a material 11 (see, e.g., FIGS. 1A-1B and 7A-7C) which can be a light absorbing material. In some embodiments, material 11 includes a plurality of light absorbing particles 12 (see, e.g., FIGS. 8A-8C). In some embodiments, light absorbing material 11 includes a plurality of electrically charged light absorbing particles 12.

The optical component can have a length L (see, e.g., FIGS. 9-10) in a direction orthogonal to the height and width directions of at least about 0.5, 1, 2, or 3 cm, for example. In some embodiments, the length L can be up to about 2 m, 1 m, 500 cm, 400 cm, 300 cm, 200 cm, or 100 cm, for example. For example, the length L can be in a range of about 1 cm to about 1 m. The length may be desired to be at least about 0.5 cm, for example, to be useful for practical applications while it may be desired that the length be no more than about 2 m so that liquid can substantially fill the optical cavities from edges of an assembly of optical components along the length direction. The width WT (see, e.g., FIGS. 2, 3, 10) of the optical component along the width direction (x-direction) can be arbitrarily large since this can be along a machine direction of a continuous roll-to-roll process used to make the optical components. Alternatively, the width WT may be in any of the ranges described for the length. For example, the width WT can be in a range of about 1 cm to about 1 m. The length and width of the optical component may each be in a range suitable for covering a display (e.g., a cell phone display, a computer display, or a television display), for example.

Figure 8A:
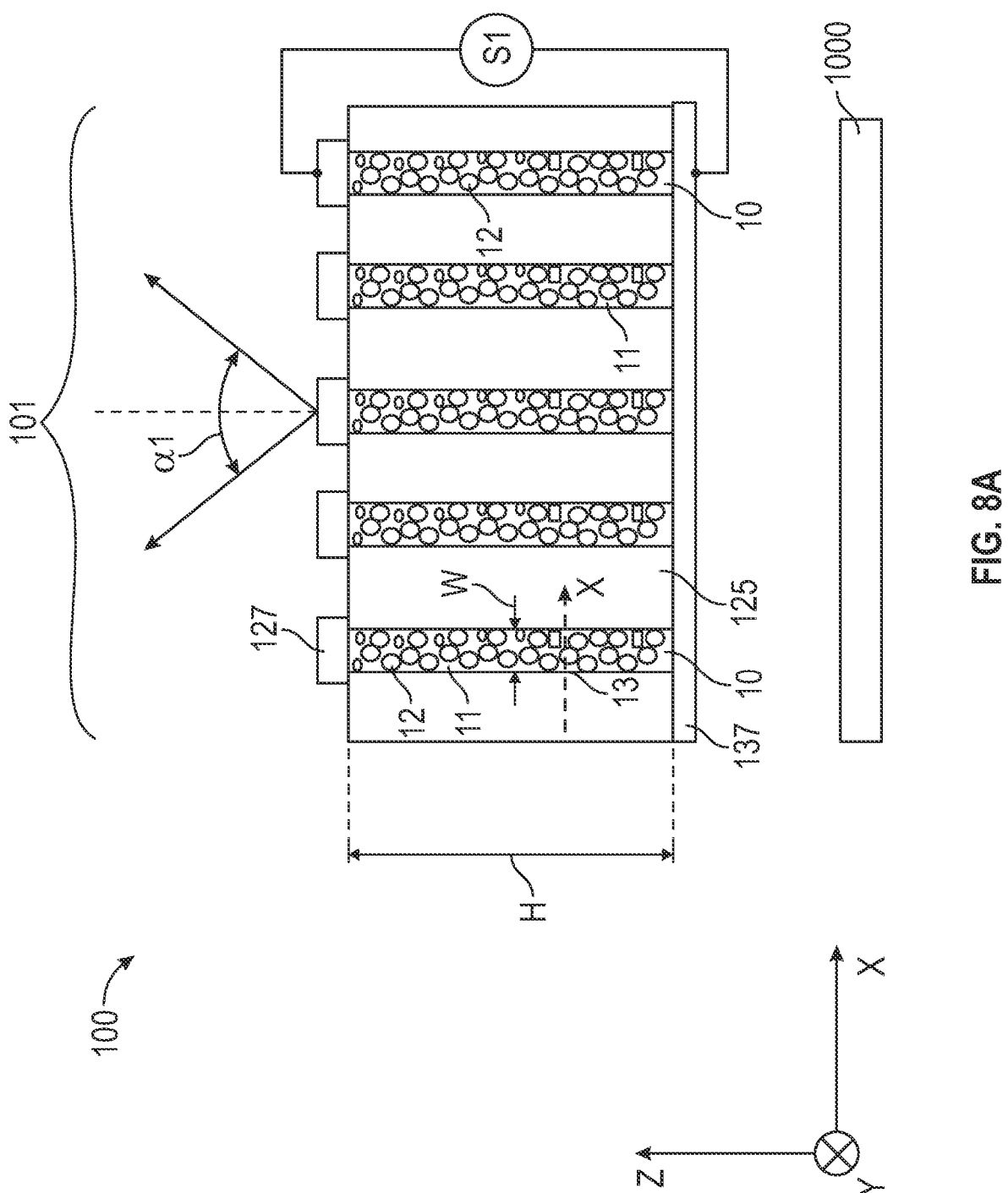
FIGS. 8A-8C are schematic cross-sectional views of light control films, according to some embodiments.
Figure 8B:
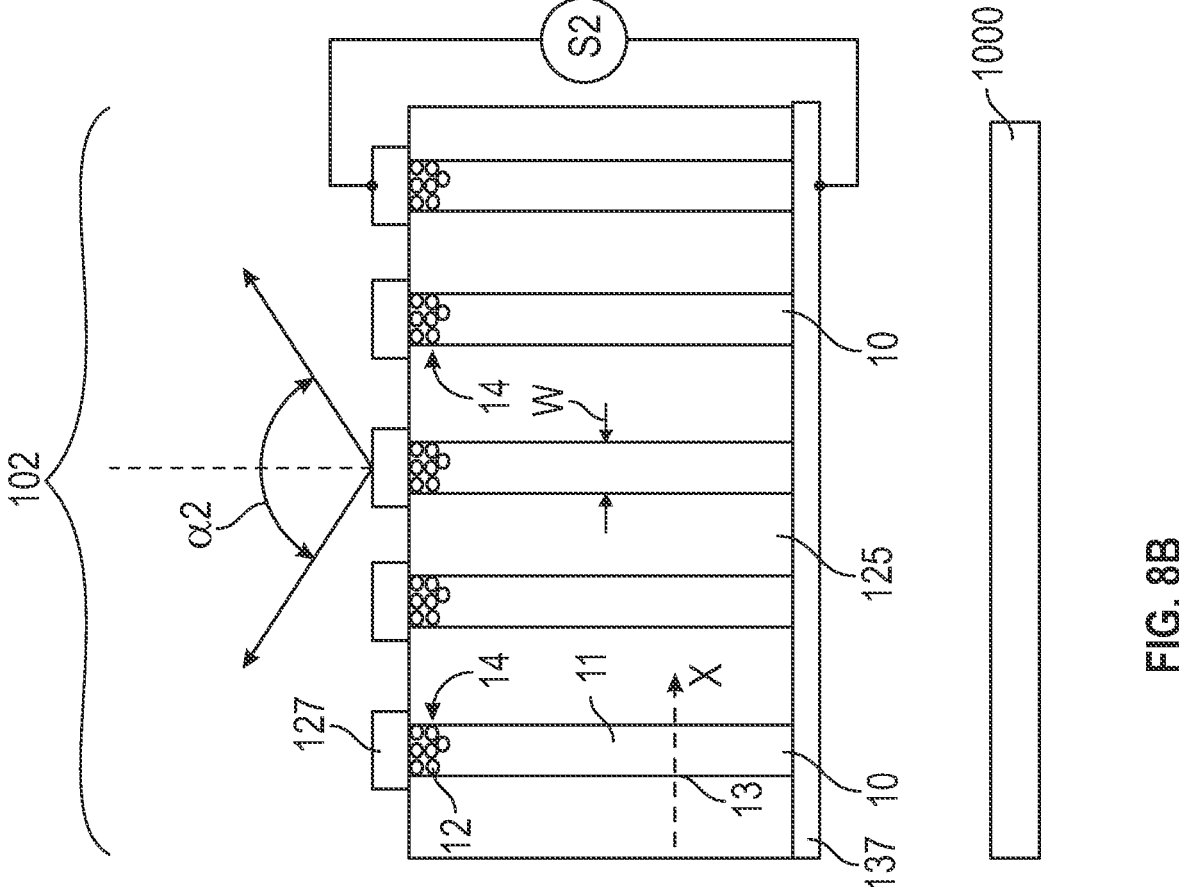
Figure 8C:
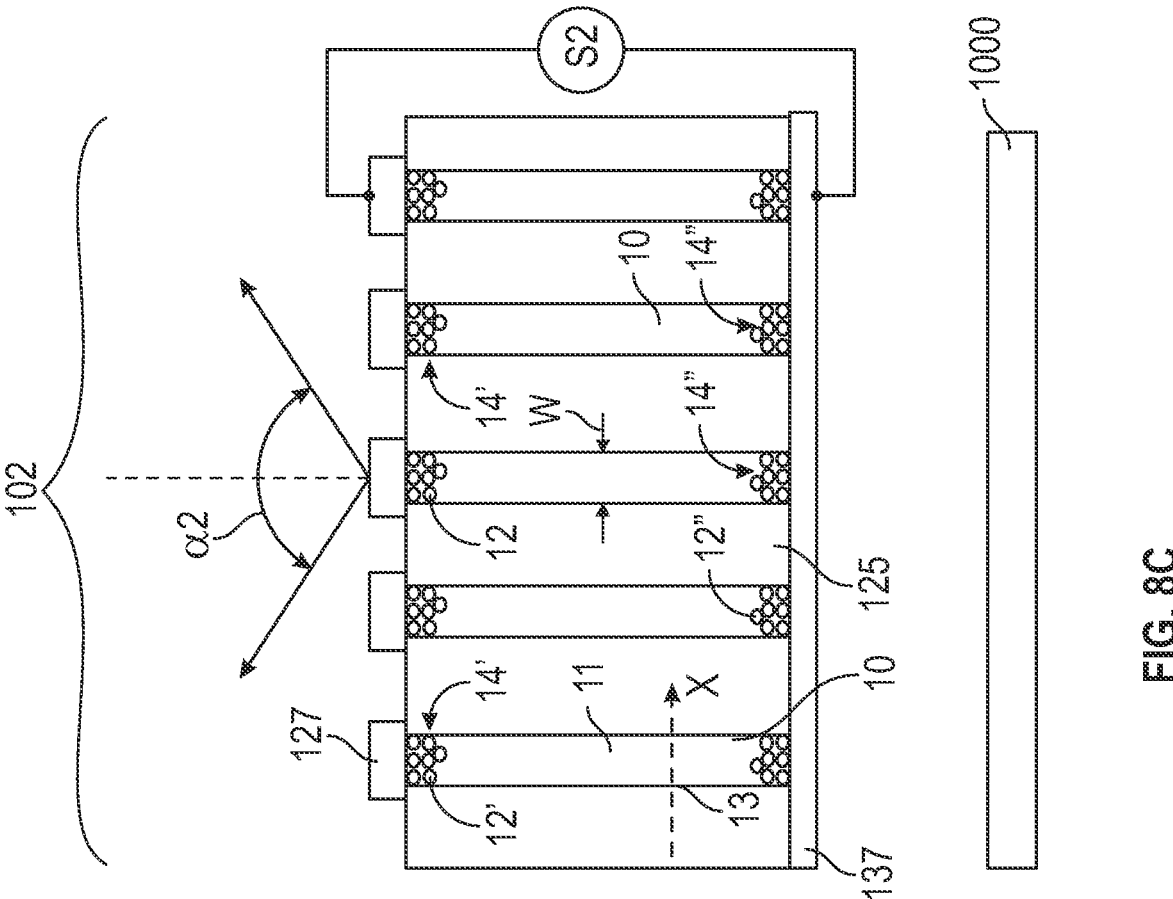
Figure 8C:
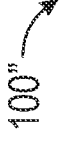
Figure 8C:
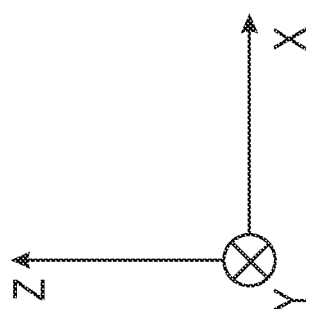

FIG. 8A is a schematic cross-sectional views of a light control film 100 in a narrow full viewing angle mode, according to some embodiments. FIGS. 8B-8C are schematic cross-sectional views of a light control film 100', 100" in a wide full viewing able mode, according to some embodiments. The light control film 100', 100" can be, or correspond to, the light control film 100 after switching the viewing mode. The particles 12 of the light control film 100' can have a same charge so that the particles 12 move to a location 14 adjacent a same side of the film. The plurality of particles 12 of the light control film 100" can include a plurality of first particles 12' and a plurality of second particles 12" where the first and second particles have opposite electrical charges. This can result in the first and second particles 12' and 12" moving to respective locations 14' and 14" adjacent opposite sides of the film. The optically transmissive regions 125 can correspond to structures 20, 30, for example.

In some embodiments, a light control film 100 includes a plurality of substantially parallel optical cavities 10. Cavities can be parallel when they are straight or when they are curved in a same direction or directions. For example, the cavities can have a same wavy curvature along the y-direction, for example, and still be considered parallel. Substantially parallel cavities can extend primarily along directions parallel to within about 30, 20, 15, 10, or 5 degrees. Each of the optical cavities can have a height H along a thickness direction (z-axis) of the light control film and a minimum lateral dimension W along an in-plane width direction (x-direction) orthogonal to the thickness direction, where H≥W or in a range described elsewhere herein. The optical cavities 10 can be substantially filled (e.g., greater than 50, 60, 70, 80, 90, 95, 98, 99 percent of a total volume of the optical cavities can be filled) with a liquid 11 comprising a plurality of light absorbing particles 12 configured to move along the thickness direction in response to one or more applied signals or fields (e.g., S1, S2) such that the movement along the thickness direction causes each of the optical cavities to transition between a substantially opaque state 101 and a substantially transparent state 102. A full viewing angle $\alpha 1$, $\alpha 2$ of the light control film increases when the optical cavities transition from the substantially opaque state to the substantially transparent state. The full viewing angle of the light control film can increase by at least about 10, 15, 20, 25, 30, 35, 40, 45, 50, 55, 60, 65, 70 degrees (e.g., $\alpha 2 - \alpha 1$ can be at least about 10 degrees or in another of these ranges) when the optical cavities transition from the substantially opaque state 101 to the substantially transparent state 102. The increase ($\alpha 2 - \alpha 1$) in the full viewing angle can be up to about 160, 140, or 120 degrees, for example.

The full viewing angles $\alpha 1$ and $\alpha 2$ can be determined from the geometry of the light control film as schematically illustrated in FIGS. 1A-1B, for example. Alternatively, the full viewing angles can be measured as a full width at half maximum (FWHM) of a transmission versus transmitted angle of visible light transmitted through the light control film from a substantially Lambertian light source 1000. Here, the transmitted angle is an angle (polar angle) of transmitted light relative to the thickness direction in a plane (xz-plane) parallel to the thickness and width directions. The visible light can have wavelengths from about 400 to 700 nm or from about 420 to 680 nm, for example. The substantially Lambertian light source 1000 can be nominally Lambertian or sufficiently Lambertian so as not to significantly change (e.g., not more than by about 10 or 5 percent) the resulting FWHM from that determined using a Lambertian light source. The full viewing angles $\alpha 1$ and $\alpha 2$ schematically illustrated in FIGS. 8A-8C, for example, can be the FWHM of the transmission of light from the substantially Lambertian light source 1000. Intensity profiles of light transmitted through a light control film from a Lambertian light source are described in U.S. Pat. No. 9,740,018 (Ouderkirk et al.), for example.

In some embodiments, a display system includes a display panel and a light control film described herein disposed on, and substantially coextensive with, the display panel. For example, the light source 1000 of FIGS. 8A-8C can be or include a display panel. The display panel can be a liquid crystal display panel, an organic light emitting diode (OLED) display panel, or a micro-light emitting diode (μ-LED) display panel, for example. The light control film can be substantially coextensive in length and width with the display panel.

In some embodiments, the one or more applied signals or fields includes one or more electrical signals. For example, S2 in FIGS. 8B-8C can represent an electrical signal corresponding to an electric field along the thickness direction causing the particles to move along the thickness direction. Alternatively, S2 may schematically represent an applied (e.g., electric or gravitational) field. The particles can be electrically charged so that they move in response to an applied electric field. When the field is removed, the charged particles can spread apart in the liquid to become substantially uniformly dispersed as schematically illustrated in FIG. 8A. The optical cavities may be electrically neutral overall (e.g., so that electrostatic forces do not tend to drive the particles to agglomerate primarily along boundaries of the optical cavities). For example, oppositely charged particles may be used or the particles and the continuous phase of the liquid can have opposite electrical charge. In some embodiments, the one or more applied signals or fields is or includes a gravitational field at least partially along the thickness direction. For example, gravity may pull the particles to one side (see, e.g., FIG. 8B) and the light control film can be shaken, for example, to redistribute the particles in the optical cavity 10.

In some embodiments, the light control film 100 further includes a first substantially transparent electrically conductive layer 137 (or layer 37, for example, schematically illustrated in FIGS. 1A-1B) disposed on a first side of the plurality of substantially parallel optical cavities 10. In some embodiments, the light control film 100 includes a second substantially transparent electrically conductive layer (e.g., layer 27 schematically illustrated in FIGS. 1A-1B) disposed on a second side of the plurality of substantially parallel optical cavities opposite the first side. The first and second substantially transparent electrically conductive layers can be substantially coextensive with one another. In some embodiments, the light control film 100 includes a plurality of electrically conductive ribbons 127 disposed on a second side of the plurality of substantially parallel optical cavities opposite the first side, where the ribbons extend along a length direction (y-direction) orthogonal to the width and thickness directions and are arranged along the width direction (see, e.g., FIG. 9) such that the ribbons are aligned with the optical cavities in one-to-one correspondence. In some embodiments, the ribbons are metallic and/or substantially optically reflective. The reflectivity of the ribbons can improve recycling efficiency when used with recycling liquid crystal displays, for example, as described in in CN Utility Model No. 201922348485.4, for example. Suitable methods of applying ribbons include coating or printing (e.g., printing and curing silver ink) the ribbons, utilizing the transfer methods described in U.S. Pat. No. 11,117,358 (Gotrik et al.) and U.S. Pat. Appl. Pub. No. 2020/0136086 (Gotrik et al.), for example, or forming the ribbons on another substrate (e.g., a polyethylene terephthalate or polycarbonate substrate) and then attaching the substrate to the light control film with the ribbons facing the light control film and aligned with the optical cavities. The ribbons can be formed on the substrate as generally described in International Appl. Pub. Nos. WO 2020/225731 (Johnston et al.) and WO 2020/227280 (Johnston et al.), for example. The ribbons can be metal (e.g., silver) and can have an average thickness of at least about 40, 50, 60, or 70 nm, for example. The average thickness can be less than about 10, 5, 3, 2, 1, or 0.5 micrometers, for example. The average width of the ribbons can be in a range of about 0.8 to 2 or 0.9 to 1.5 or 1 to 1.2 times the average width of the optical cavities, for example.

In some embodiments, for each of the optical cavities 10, the optical cavity has respective first and second optical absorptions along the width direction of the optical cavity at a same first location 13 along the thickness direction of the optical cavity when the optical cavity is in the respective substantially opaque and substantially transparent states. The second optical absorption can be (e.g., substantially) smaller than the first optical absorption. For example, the second optical absorption can be less than ½ the first optical absorption. The second optical absorption can be less than about 30, 20, 10, or 5 percent while the first optical absorption can be greater than about 50, 60, 70, or 90 percent, for example. The first and second optical absorptions can be determined at a predetermined visible wavelength (e.g., 550 nm) or as averages over a predetermined visible wavelength range (e.g., 420 nm to 680 nm).

In some embodiments, a light control film 100 includes a plurality of substantially parallel optical cavities 10. Each of the optical cavities has a height H along a thickness direction (z-direction) of the light control film and a minimum lateral dimension W along an in-plane width direction (x-direction) orthogonal to the thickness direction, where H≥W or in a range described elsewhere herein. Each of the optical cavities 10 can be substantially filled with a liquid 11 comprising a plurality of light absorbing particles 12 substantially uniformly dispersed therein (e.g., dispersed sufficiently uniformly therein that the optical absorption of the optical cavity in the width direction does not vary by more than about 30, 20, 15, 10, or 5 percent along the thickness direction) so that the optical cavity has a first optical absorption along the width direction of the optical cavity at at least a first location 13 along the thickness direction of the optical cavity, such that in response to a first electrical signal (e.g., S2) at least a majority of the light absorbing particles in the liquid move to one or more predetermined locations (e.g., 14 or 14', 14") within the optical cavity resulting in the optical cavity having a second optical absorption along the width direction of the optical cavity at the at least the first location along the thickness direction, where the second optical absorption is smaller than the first optical absorption. In some embodiments, a full viewing angle of the light control film increases by at least 10 degrees (or in a range described elsewhere herein for α2−α1) when the light absorbing particles 12 move from being substantially uniformly dispersed in the liquid to the one or more predetermined locations. The optical absorption can be determined for substantially normally incident light (e.g., along x-direction) at a same first location 13 for a same predetermined wavelength or wavelength range.

In some embodiments, each optical cavity 10 extends along the thickness direction between opposing ends of the optical cavity. The one or more predetermined locations can include a location 14 adjacent one of the opposing ends. The one or more predetermined locations can include locations 14', 14" adjacent each of the opposing ends. In some embodiments, the first location 13 is disposed about halfway between the opposing ends (e.g., within about 10% of H of the midpoint between the opposing ends).

The optical cavities 10 may be defined by one or more microstructured films of the light control film 100. For example, in some embodiments, as described further elsewhere herein, the light control film 100 includes first and second optical components including respective pluralities of first and second structures formed on, and extending from, respective first and second substrates, where the first and second optical components are assembled so that the first and second structures are disposed between the first and second substrates and interleaved to form a plurality of pairs of adjacent first and second structures, where each optical cavity of the plurality of optical cavities is defined between a pair of adjacent first and second structures.

Figure 9:
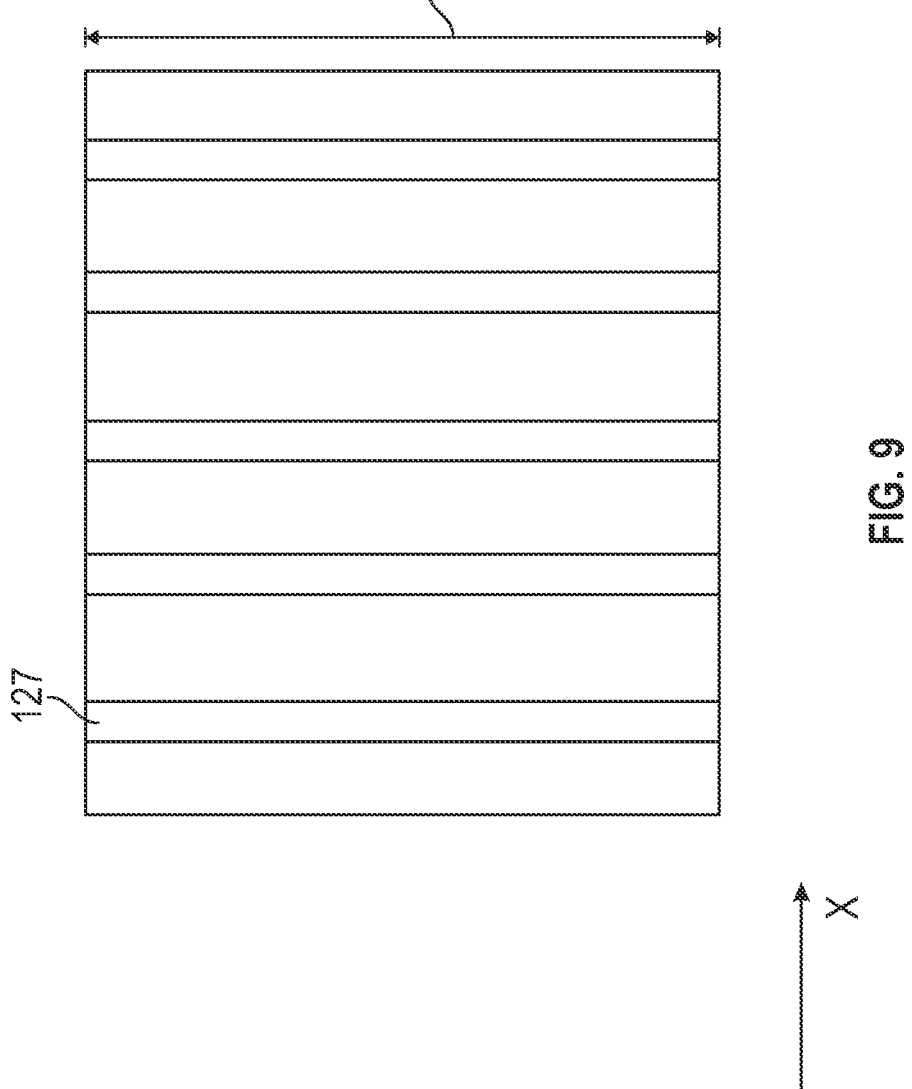
FIG. 9 is a schematic top view of a light control film, according to some embodiments.

FIG. 9 is a schematic top view of a light control film 100, according to some embodiments. The light control film 100 has a length L along a length direction (y-direction) orthogonal to the height (z-direction) and width (x-direction) directions.

Figure 10:
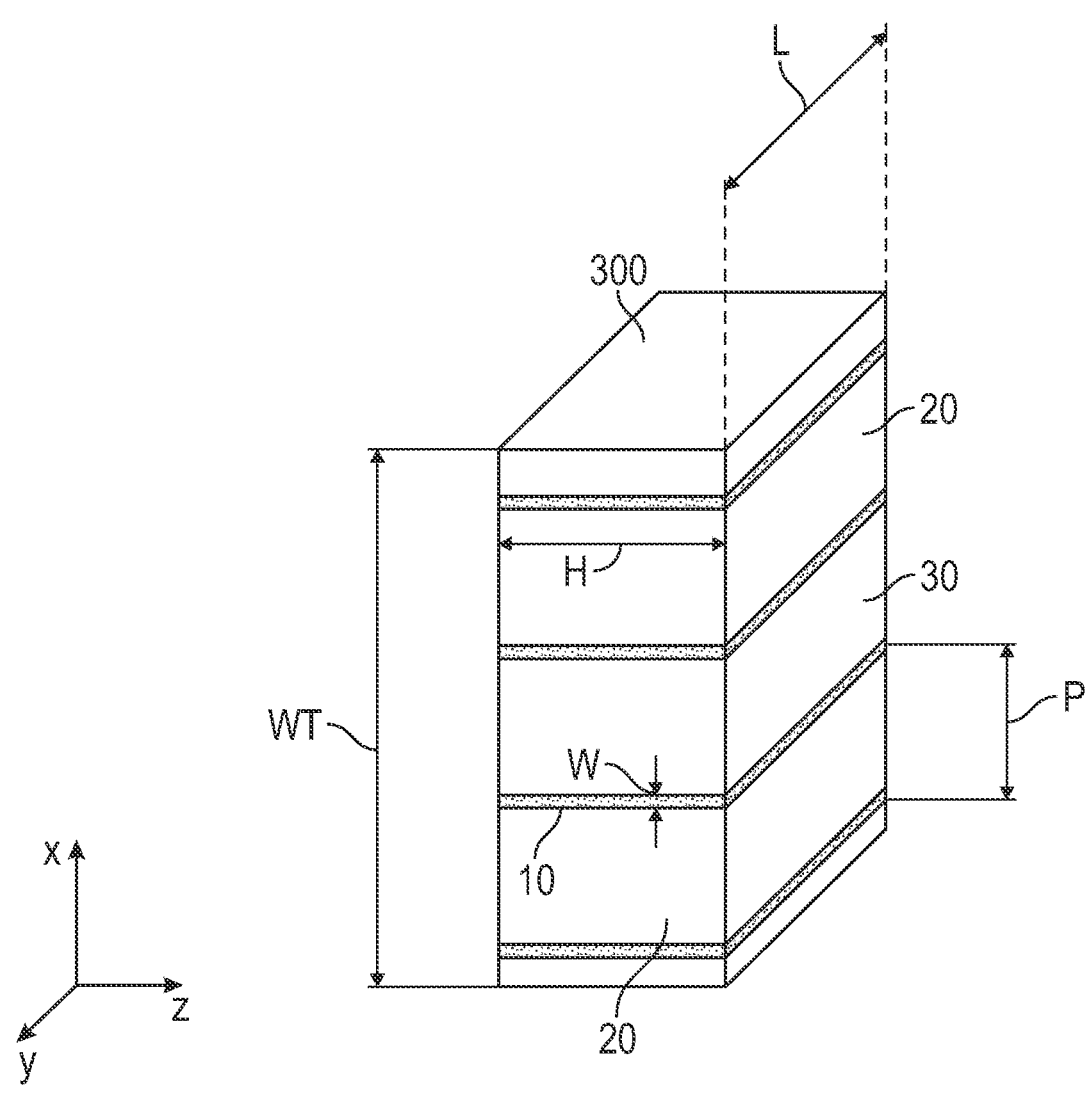
FIG. 10 is a schematic perspective view of a portion of a light control film, according to some embodiments.

FIG. 10 is a schematic perspective view of a portion of a light control film 300, according to some embodiments. The light control film 300 can correspond to light control film 100 or 200, for example, and the portion schematically illustrated in FIG. 10 can be the light control film with outer conductive layers and other outer layers removed. In some embodiments, each of the optical cavities 10 of the light control film 100, 200, 300 has a generally rectangular parallelepiped shape having a length L along the length direction (y-direction), a width W along the width direction (x-direction), and a height H along the height direction (z-direction). H/W can be at least 10 or in any range described elsewhere herein. L/H can be at least 10, 20, 50, 100, 200, or 300, for example. The optical cavities 10 can be arranged along the width direction at an average pitch P. P/W can be at least 5, 10, 15, 20, or 25, for example. In some embodiments, the optical cavities 10 are arranged along the width direction with a uniform pitch. In other embodiments, the optical cavities are arranged with spacing between adjacent optical cavities alternating between smaller and larger spacings as schematically illustrated in FIG. 3. In this case, the average pitch P is that mean of the smaller and larger spacings.

The light absorbing particles 12 can be or include electrically charged particles. The particles 12 can be substantially permanently electrically charged (e.g., the particles can stay charged over typical lifetimes of electronic display devices such as cell phones). The particles 12 can be triboelectrically charged. Suitable triboelectrically charged particles are described in U.S. Pat. No. 7,550,101 (Yang et al.), for example. In some embodiments, the particles include one or more of carbon black particles, manganese ferrite black spinel particles, inorganic particles, dyed resin particles, titania particles, or guest host liquid crystal particles. In some embodiments, the light absorbing particles 12 have an average particle size (e.g., Dv50) less than about 6, 4, 2, 1, 0.8, 0.6, or 0.5 micrometers, for example. The particles 12 can have an average particle size (e.g., Dv50) of at least about 50, 75, 100, 150, 200, or 250 nm, for example. In some embodiments, each of at least a majority (greater than 50 percent by number) of the particles 12 can have a largest dimension less than about 6, 4, 2, 1, 0.8, 0.6, or 0.5 micrometers, for example. The at least a majority of the particles can be greater than about 60, 70, 80 or 90 percent of the particles. The particles 12 can be nanoparticles (particles having a diameter less than 1 micron but greater than 1 nanometer), for example. The particles 12 can be regularly or irregularly shaped. In some embodiments, the particles 12 are generally spherical particles, for example. In some embodiments, the particles 12 have an average aspect ratio of less than about 3, 2, or 1.5 where the aspect ratio of a particle is it largest dimension (e.g., length) divided by its smallest dimension (e.g., width). The loading of the particles can be selected to be high enough to provide sufficient optical absorption when the particles are substantially uniformly distributed in the optical cavities and low enough that at least a majority of the particles can move to end(s) of the optical cavities leaving center portions of the optical cavities substantially optically transparent. For example, carbon black may be included at 2 to 8 weight percent based on a total weight of the liquid including the particles. A dispersant (e.g., dodecylamine) may be added to the liquid to aid in preventing undesired agglomeration of the particles.

In some embodiments, the liquid 11 comprises an electrically neutral continuous phase. In some embodiments, the particles 12 have a first electrical charge, and the liquid comprises a continuous phase having an opposite second charge. In some embodiments, the liquid 11 comprises an electrically neutral continuous phase and the plurality of particles 12 include pluralities of first and second particles 12' and 12" having opposite electrical charge. In some embodiments, the liquid comprises a continuous phase comprising a non-polar liquid. In some embodiments, the liquid comprises a continuous phase comprising one or more of an organic liquid, a saturated linear or branched hydrocarbon, a silicone polymeric liquid. The continuous phase can include a glycol ether such as propylene glycol methyl ether acetate, for example.

The particles and continuous phase of the liquid can be formed from materials commonly used in electrophoretic ink used in reflective displays such as those of electronic readers. Useful electrophoretic materials are described in U.S. Pat. No. 6,323,989 (Jacobson et al.); U.S. Pat. No. 7,550,101 (Yang et al.); U.S. Pat. No. 7,679,814 (Paolini, Jr. et al.); U.S. Pat. No. 9,822,232 (Farrand et al.); and U.S. Pat. No. 10,113,072 (Inoue et al.); U.S. Pat. No. 10,150,877 (Komatsu et al.), for example, and in U.S. Pat. Appl. Pub. Nos. 2020/0165479 (De Keyzer et al.) and 2020/0341342 (Wu et al.), for example.

EXAMPLES

Figure 11:
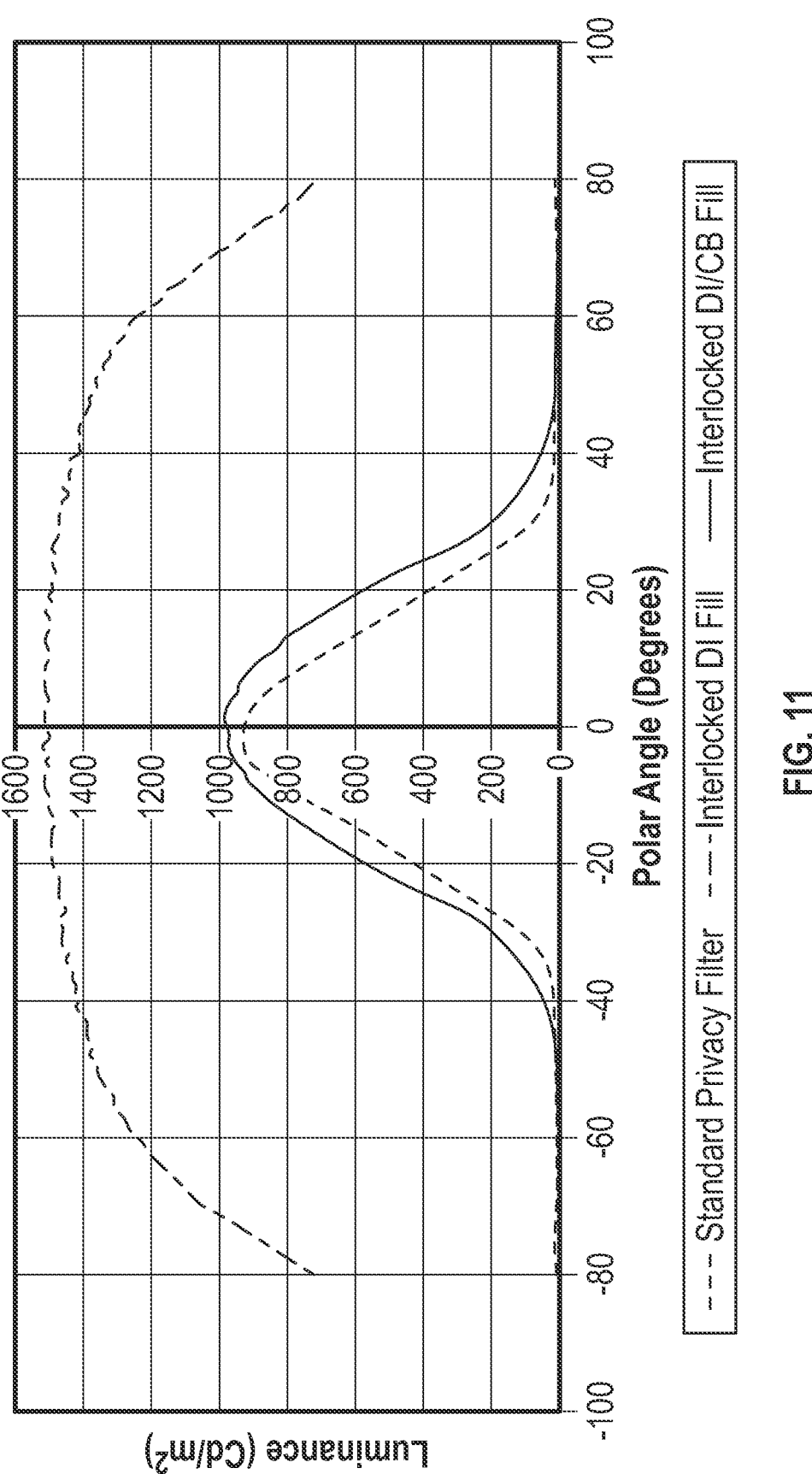
FIG. 11 are plots of luminance versus viewing angle for light control films, according to some embodiments.

Optical components corresponding to optical components 120' and 130' schematically illustrated in FIG. 3 were made as generally described in paragraphs [0152]-[0153] of U.S. Pat. Appl. Pub. No. 2022/0019007 (Schmidt et al.). The structures 20' and 30' had a same average height H1 of about 88 micrometers and a same average pitch P1 of about 61 micrometers. The structures 20' and 30' had average widths W1' and W1" of about 29 and 26 micrometers, respectively, measured at the tops of the structures. The optical components were brought together to form an assembly similar to assembly 200' schematically illustrated in FIG. 3. The resulting optical cavities 10 had an average width of about 3 micrometers. The assembly was optically transparent. A mixture of carbon black (CAB-O-JET 352K available from Cabot Corporation, Boston, MA) at 3 weigh percent in distilled deionized water was added to the optical cavities 10 from sides of the assembly. Visual inspection indicated that the liquid was pulled into the optical cavities via capillary action. The resulting film was measured for luminance above a Lambertian light source and conoscopic plots were generated. Comparison was made to a traditional privacy filter as well as a construction formed by using pure distilled deionized water (DI) instead of carbon black (CB) in DI with the same structure as described above. Results are shown in FIG. 11.

Figure 12:
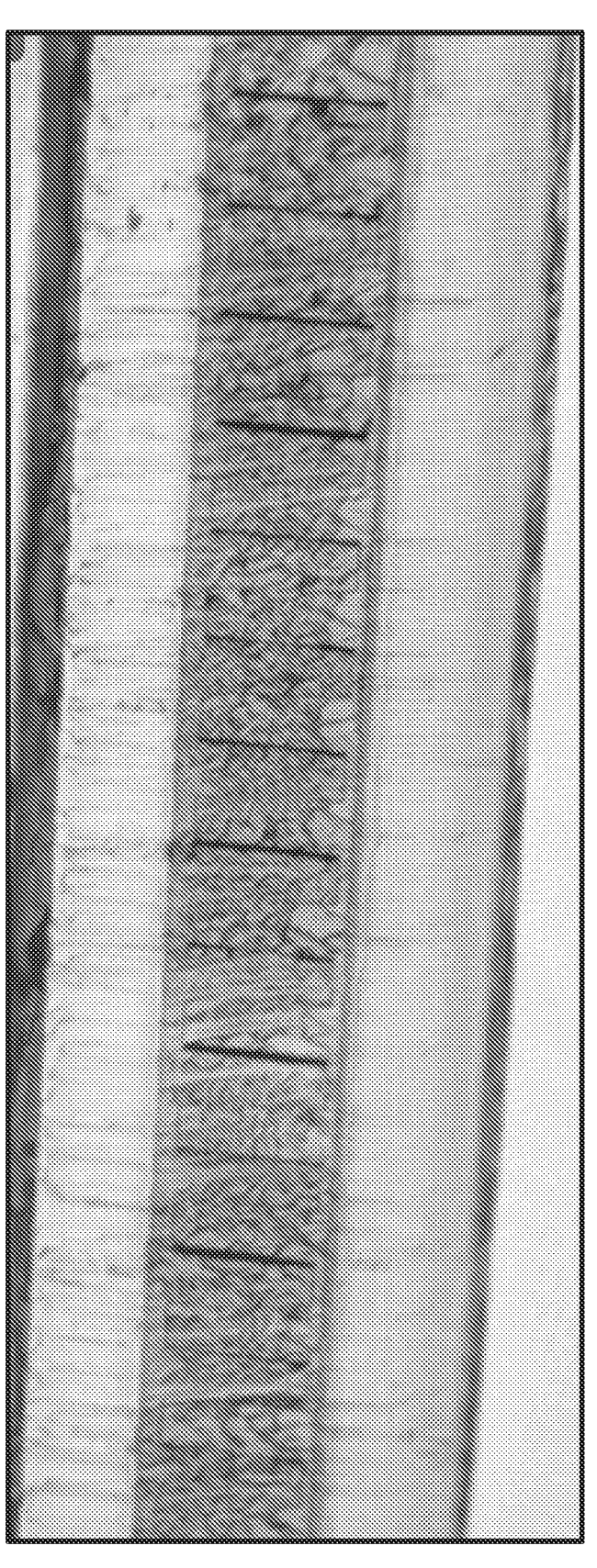
FIG. 12 is a cross-sectional view of a light control film, according to some embodiments.

Another sample was prepared by placing a black UV-curable ink (9344 FR Process Black, from Nazdar Ink Technologies, Shawnee, KS) between optical components corresponding to optical components 120' and 130' schematically illustrated in FIG. 3 prior to backside lamination by hand using a razor blade to increase the lamination pressure felt by the ink as the optical components were pressed together. The lamination direction was along the louvers. The black resin then filled the regions between the structures and after lamination the laminate was cured with ultraviolet (UV) light. The resulting film was then cross-sectioned to observe the clear and black regions. The cross-section is shown in FIG. 12.

To show that particles in an optical cavity could be moved by applying an electrical signal to substantially change the optical transmittance/absorption of the cavity, a mixture of carbon black (CAB-O-JET 352k available from Cabot Corporation, Boston, MA) in distilled deionized water at a concentration of 0.3% by weight was placed between glass slides between strips of copper tape spaced apart by 12 mm. The tape was 75 micrometers thick which defined the thickness of the optical cavity. Transmission through the optical cavity from a Lambertian light source was measured and conoscopic plots were generated. The on-axis (z-direction) transmission when no voltage was applied was about 9 percent. After applying 100 volts across the strips of copper tapes for 30 seconds, this on-axis transmission increased to about 60 percent. After waiting longer with the voltage applied, the on-axis transmission dropped to a steady state value of about 50 percent. The transmission after 30 seconds and the steady state transmission were each greater than about 40% for a range of polar angles from about −70 to 70 degrees while the transmission was less than about 10% for the same range of polar angles for the zero voltage state. The results show that the carbon black particles could be moved within the optical cavity by applying a voltage to substantially increase the transmission through the optical cavity.

Figure 13:
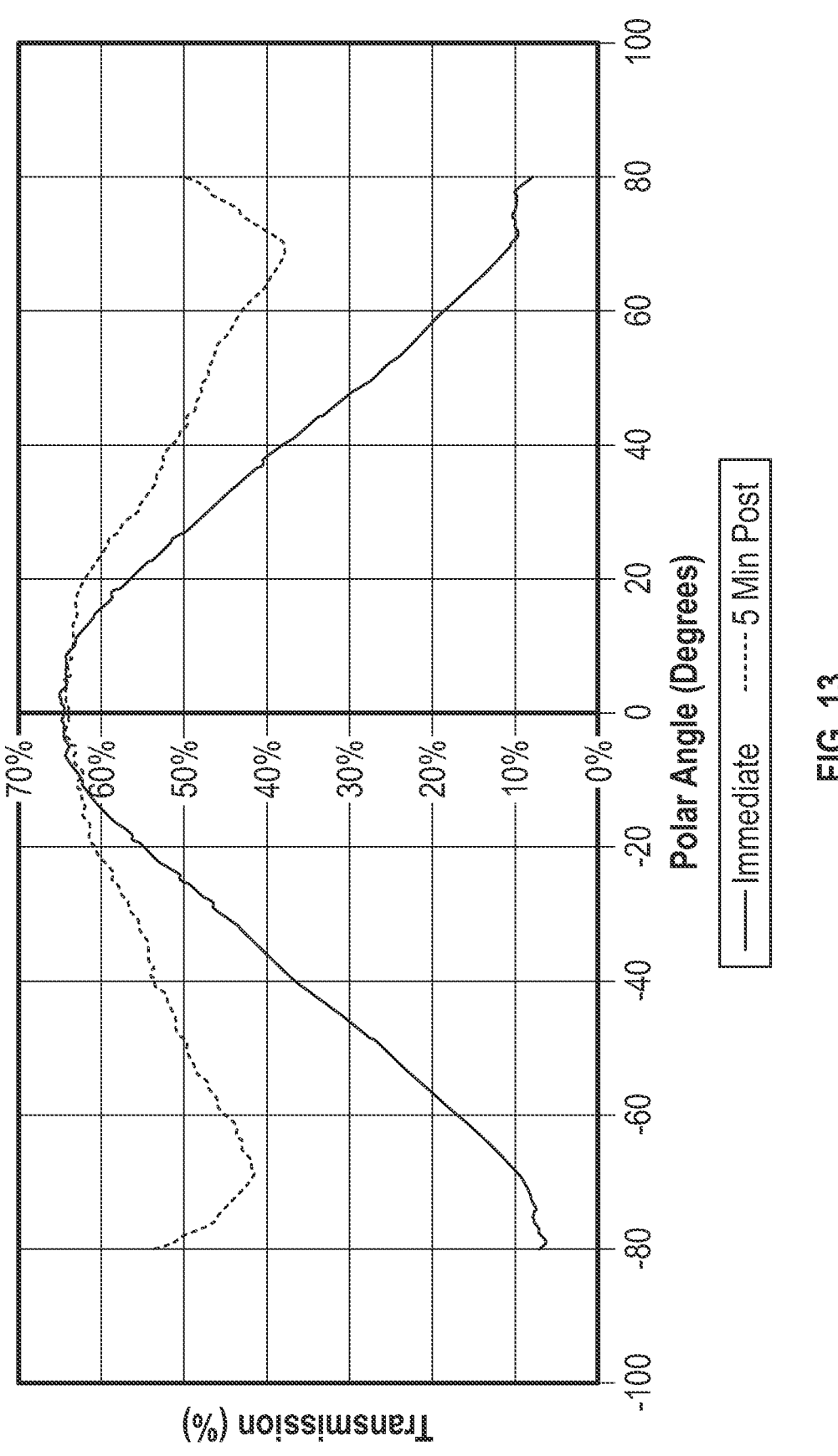
FIG. 13 are plots of transmission versus viewing angle for a light control film, according to some embodiments.

To show that particles in an optical cavity (louver) of a light control film can be moved to significantly change the transmission verses angle, a mixture of carbon black (Cabot TPK1227R available from Cabot Corporation, Boston, MA) at 4 weigh percent in propylene glycol methyl ether acetate (PGMEA) with a small amount (less than 0.01 wt %) of dodecylamine added as a dispersant to cavities defined in a film similar to the optical component described earlier in the Examples that was similar to the microstructured article described in U.S. Pat. No. 8,012,567 (Gaides et al.). Transmission was measured immediately after filling and again 5 minutes after filling. 5 minutes was sufficient time for significant settling of the carbon black particles due to gravity as was apparent from visual inspection of a sample vial. In each case the transmission for visible light from a Lambertian light source was measured and conoscopic plots were generated. The resulting plots of transmission versus polar angle (angle between normal direction (z-direction) and viewing direction in the xz-plane) are shown in FIG. 13. The on-axis transmission was about 65 percent in each case. For the 5 minutes of settling case (labeled "5 min post" in FIG. 13), the transmission versus polar angle had a minimum of about 40 percent at polar angles of about ±70 degrees and there was no polar angle in the measured range of −80 to 80 degrees where the transmission dropped to 50 percent of its on-axis value indicating a full viewing angle of greater than 160 degrees. For the immediately filled case (labeled "Immediate" in FIG. 13), the transmission versus polar angle dropped off substantially more steeply and was about 10 percent at polar angles of about ±70 degrees. The transmission versus angle had a full width at half maximum (FWHM) of about 80 degrees in this case. The results show that the full viewing angle increased by greater than about 80 degrees when the carbon black particles moved toward the bottom of the louvers.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially" with reference to a property or characteristic is not otherwise clear to one of ordinary skill in the art in the context in which it is used and described in the present description and when it would be clear to one of ordinary skill in the art what is meant by an opposite of that property or characteristic, the term "substantially" will be understood to mean that the property or characteristic is exhibited to a greater extent than the opposite of that property or characteristic is exhibited.

All references, patents, and patent applications referenced in the foregoing are hereby incorporated herein by reference in their entirety in a consistent manner In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. A light control film comprising a plurality of substantially parallel optical cavities, each of the optical cavities having a height H along a thickness direction of the light control film and a minimum lateral dimension W along an in-plane width direction orthogonal to the thickness direction, H≥W, the optical cavities substantially filled with a liquid comprising a plurality of light absorbing particles configured to move along the thickness direction in response to one or more applied signals or fields such that the movement along the thickness direction causes each of the optical cavities to transition between a substantially opaque state and a substantially transparent state, wherein a full viewing angle of the light control film increases when the optical cavities transition from the substantially opaque state to the substantially transparent state, wherein the light control film comprises first and second optical components comprising respective first and second unitary elements, the first and second unitary elements comprising respective first and second polymeric layers and respective pluralities of first and second structures formed on, and extending from, the respective first and second polymeric layers, the first and second optical components assembled so that the first and second structures are disposed between the first and second polymeric layers and interleaved to form a plurality of pairs of adjacent first and second structures, wherein each optical cavity of the plurality of optical cavities is defined between a pair of adjacent first and second structures.

2. The light control film of claim 1, wherein the one or more applied signals or fields comprises one or more electrical signals.

3. The light control film of claim 1 further comprising a first substantially transparent electrically conductive layer disposed on a first side of the plurality of substantially parallel optical cavities.

4. The light control film of claim 3 further comprising a second substantially transparent electrically conductive layer disposed on a second side of the plurality of substantially parallel optical cavities opposite the first side, the first and second substantially transparent electrically conductive layers substantially coextensive with one another.

5. The light control film of claim 3 further comprising a plurality of electrically conductive ribbons disposed on a second side of the plurality of substantially parallel optical cavities opposite the first side, the ribbons extending along a length direction orthogonal to the width and thickness directions and being arranged along the width direction such that the ribbons are aligned with the optical cavities in one-to-one correspondence.

6. The light control film of claim 1, wherein the particles are electrically charged.

7. The light control film of claim 1, wherein the full viewing angle of the light control film increases by at least about 30 degrees when the optical cavities transition from the substantially opaque state to the substantially transparent state.

8. The light control film of claim 1, wherein the first and second optical components comprise respective first and second substrates, the first and second substrates comprising the respective first and second polymeric layers and further comprising respective first and second substantially transparent electrically conductive layers, the first and second polymeric layers disposed between the first and second substantially transparent electrically conductive layers.

9. A light control film comprising a plurality of substantially parallel optical cavities, each of the optical cavities having a height H along a thickness direction of the light control film and a minimum lateral dimension W along an in-plane width direction orthogonal to the thickness direction, H≥W, each of the optical cavities substantially filled with a liquid comprising a plurality of light absorbing particles substantially uniformly dispersed therein so that the optical cavity has a first optical absorption along the width direction of the optical cavity at at least a first location along the thickness direction of the optical cavity, such that in response to a first electrical signal at least a majority of the light absorbing particles in the liquid move to one or more predetermined locations within the optical cavity resulting in the optical cavity having a second optical absorption along the width direction of the optical cavity at the at least the first location along the thickness direction, the second optical absorption smaller than the first optical absorption, wherein the light control film comprises first and second optical components comprising respective first and second unitary elements, the first and second unitary elements comprising respective first and second polymeric layers and respective pluralities of first and second structures formed on, and extending from, the respective first and second polymeric layers, the first and second optical components assembled so that the first and second structures are disposed between the first and second polymeric layers and interleaved to form a plurality of pairs of adjacent first and second structures, wherein each optical cavity of the plurality of optical cavities is defined between a pair of adjacent first and second structures.

10. The light control film of claim 9, wherein each optical cavity extends along the thickness direction between opposing ends of the optical cavity, the one or more predetermined locations comprising a location adjacent one of the opposing ends.

11. The light control film of claim 10, wherein the first location is disposed about halfway between the opposing ends.

12. The light control film of claim 9, wherein the light absorbing particles comprise electrically charged particles and the liquid comprises a continuous phase comprising a non-polar liquid.

13. The light control film of claim 9, wherein the first and second optical components comprise respective first and second substrates, the first and second substrates comprising the respective first and second polymeric layers and further comprising respective first and second substantially transparent electrically conductive layers, the first and second polymeric layers disposed between the first and second substantially transparent electrically conductive layers.

14. The light control film of claim 9, wherein a full viewing angle of the light control film increases by at least about 30 degrees when the light absorbing particles move from being substantially uniformly dispersed in the liquid to the one or more predetermined locations.

15. A light control film extending along orthogonal length and width directions of the light control film, the light control film comprising a plurality of optical cavities arranged along the width direction, each of the optical cavities extending along the length direction and along a thickness direction of the light control film orthogonal to the length and width directions, each of the optical cavities having a height H along the thickness direction and a width W along the width direction, H≥W, the optical cavities substantially filled with a liquid comprising a plurality of light absorbing particles configured to move translationally in response to one or more applied signals or fields such that the translational movement causes each of the optical cavities to transition between a substantially opaque state and a substantially transparent state, wherein a full viewing angle of the light control film increases when the optical cavities transition from the substantially opaque state to the substantially transparent state, wherein the light control film comprises first and second optical components comprising respective first and second unitary elements, the first and second unitary elements comprising respective first and second polymeric layers and respective pluralities of first and second structures formed on, and extending from, the respective first and second polymeric layers, the first and second optical components assembled so that the first and second structures are disposed between the first and second polymeric layers and interleaved to form a plurality of pairs of adjacent first and second structures, wherein each optical cavity of the plurality of optical cavities is defined between a pair of adjacent first and second structures.

16. The light control film of claim 15, wherein the full viewing angle of the light control film increases by at least about 30 degrees when the optical cavities transition from the substantially opaque state to the substantially transparent state.

17. A display system comprising a display panel and the light control film of claim 15 disposed on, and substantially coextensive with, the display panel.

* * * * *